US012399569B2

(12) United States Patent
Kaede

(10) Patent No.: US 12,399,569 B2
(45) Date of Patent: Aug. 26, 2025

(54) NON-TRANSITORY COMPUTER READABLE MEDIUM

(71) Applicant: FUJIFILM Business Innovation Corp., Tokyo (JP)

(72) Inventor: Ikumi Kaede, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/544,938

(22) Filed: Dec. 8, 2021

(65) Prior Publication Data
US 2023/0036474 A1    Feb. 2, 2023

(30) Foreign Application Priority Data

Jul. 30, 2021    (JP) .................................. 2021-126263

(51) Int. Cl.
G06F 3/01      (2006.01)
G06F 1/16      (2006.01)
G06F 3/04842   (2022.01)

(52) U.S. Cl.
CPC .............. *G06F 3/017* (2013.01); *G06F 1/163* (2013.01); *G06F 1/1694* (2013.01); *G06F 3/011* (2013.01); *G06F 3/014* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 9,588,910 B2 | 3/2017 | Ishikawa et al. | |
| 10,285,616 B2 | 5/2019 | Yoshioka et al. | |
| 11,250,225 B2 | 2/2022 | Toumazou | |
| 2012/0262381 A1* | 10/2012 | Hirsch | G06F 3/017 345/173 |
| 2013/0172022 A1* | 7/2013 | Seymour | H04M 19/04 455/458 |
| 2013/0285921 A1* | 10/2013 | Alberth, Jr. | G06F 1/1694 345/173 |
| 2015/0111558 A1* | 4/2015 | Yang | G06F 3/017 455/418 |
| 2016/0063850 A1* | 3/2016 | Yang | H04M 1/72454 340/539.22 |
| 2019/0114005 A1* | 4/2019 | Kies | G06F 3/04883 |
| 2020/0150772 A1* | 5/2020 | Quinn | G01P 15/18 |

(Continued)

FOREIGN PATENT DOCUMENTS

| | | |
|---|---|---|
| JP | 2015156186 | 8/2015 |
| JP | 2016027848 | 2/2016 |

(Continued)

OTHER PUBLICATIONS

"Office Action of Japan Counterpart Application", issued on Mar. 4, 2025, with English translation thereof, pp. 1-8.

*Primary Examiner* — Parul H Gupta
(74) *Attorney, Agent, or Firm* — JCIPRNET

(57) ABSTRACT

A non-transitory computer readable medium storing a program causing a computer of a first device to execute a process, the process comprising: switching a mode of the first device to a second mode in response to the first device being worn by a user in a second predetermined orientation, the second mode being a mode which allows the user to control a second device by performing a predetermined motion with a finger of the user.

12 Claims, 21 Drawing Sheets

(56) References Cited

U.S. PATENT DOCUMENTS

2021/0243360 A1\* 8/2021 Onoe .................... H04N 23/667
2022/0083137 A1\* 3/2022 Fountain ............... G06F 3/0416

FOREIGN PATENT DOCUMENTS

| JP | 2016115125 | 6/2016 |
|----|------------|--------|
| JP | 2016126589 | 7/2016 |
| JP | 2017005292 | 1/2017 |
| JP | 2017152890 | 8/2017 |
| JP | 2021512433 | 5/2021 |

\* cited by examiner

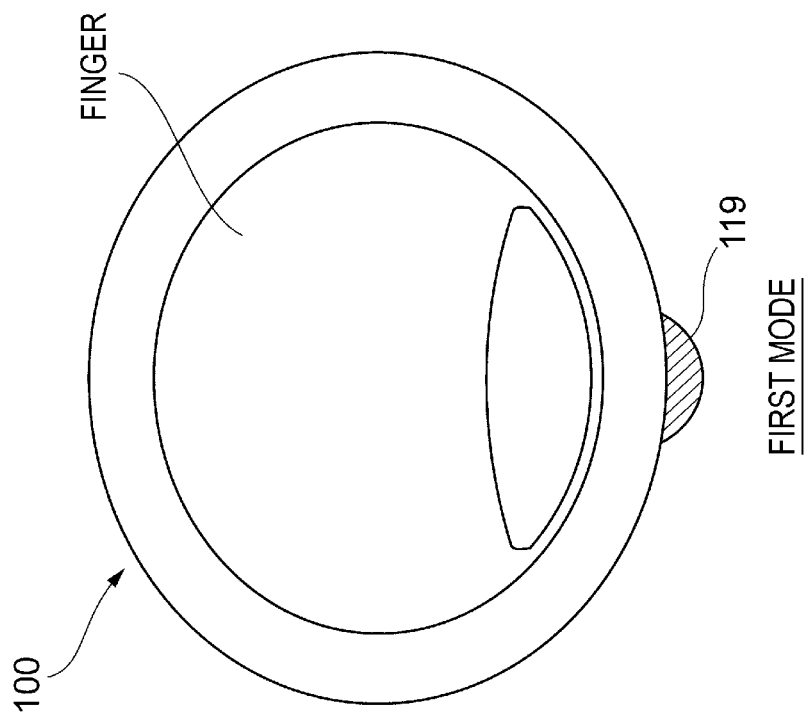
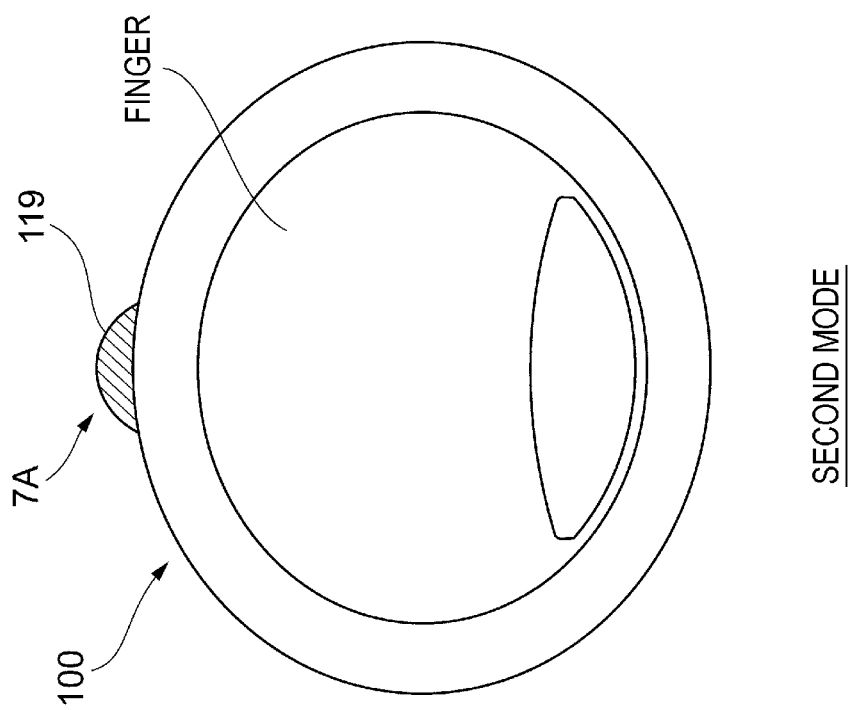

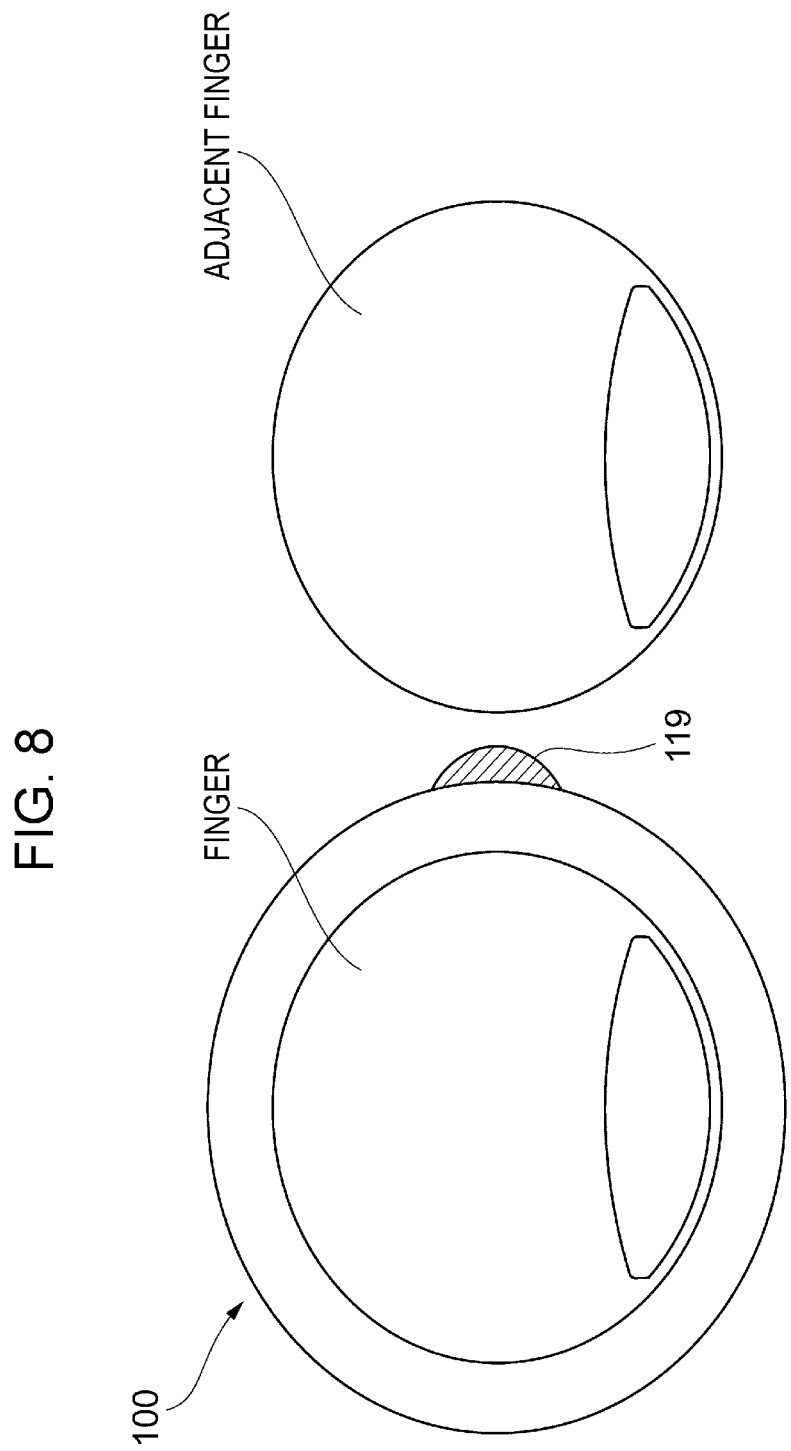

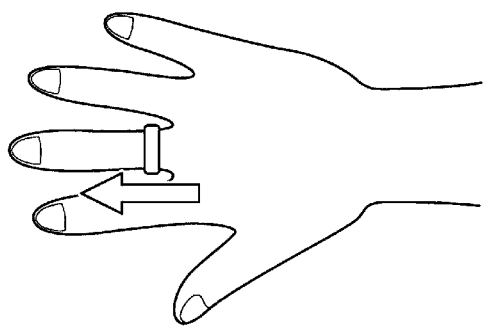
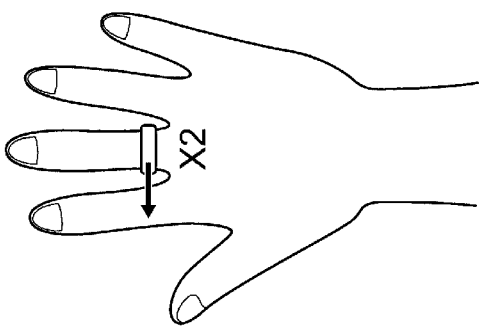
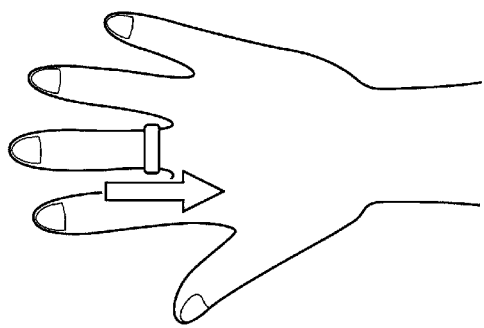
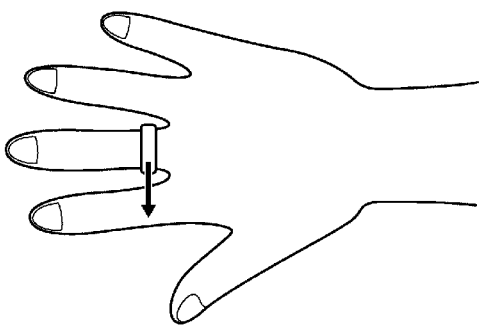
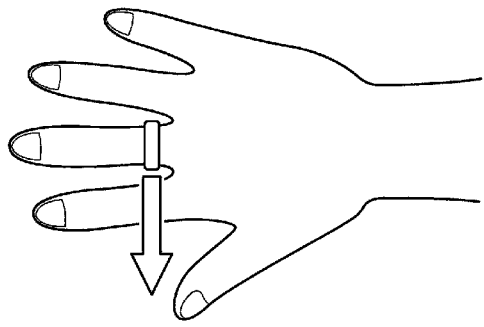
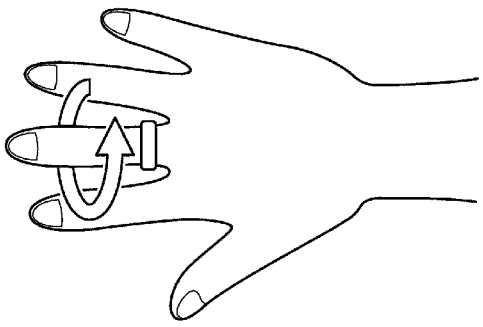
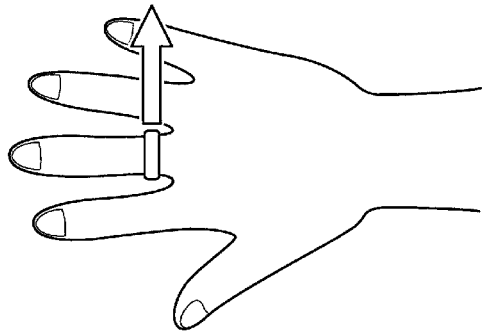
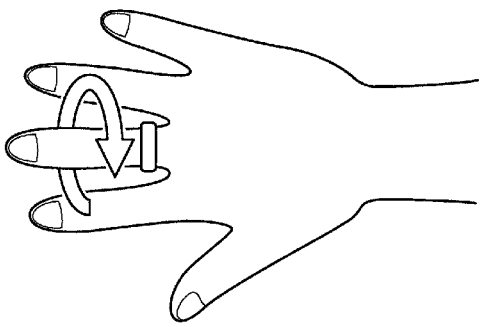

SECOND APPROACH

FIRST APPROACH

NON-TRANSITORY COMPUTER READABLE MEDIUM

CROSS-REFERENCE TO RELATED APPLICATIONS

This application is based on and claims priority under 35 USC 119 from Japanese Patent Application No. 2021-126263 filed Jul. 30, 2021.

BACKGROUND

(i) Technical Field

The present disclosure relates to a non-transitory computer readable medium.

(ii) Related Art

Japanese Unexamined Patent Application Publication No. 2015-156186 discloses an electronic device that operates in collaboration with an information processing device via first driver software installed in the information processing device and also collaborates with an external device which collaborates with the information processing device via second driver software installed in the information processing device.

Japanese Unexamined Patent Application Publication No. 2017-152890 discloses the following processing. A first wearable terminal or a second wearable terminal detects that a user has looked at the second wearable terminal, and an operation screen for a corresponding electronic device is displayed on the second wearable terminal.

Japanese Unexamined Patent Application Publication No. 2016-115125 discloses the following processing. A hand region is recognized on a camera image. A search image is extracted from a search image range having a predetermined positional relationship with the recognized hand region. A search request including the extracted search image is sent to an image recognition server and a search is conducted.

Japanese Unexamined Patent Application Publication No. 2017-5292 discloses a wireless communication terminal including a communication unit, a detector, and a controller. The communication unit connects to an external device and performs wireless communication with it. The detector detects a change of the wearing manner of the wireless communication terminal on a user. The controller controls the connection state of the wireless communication with the external device in accordance with the detected change of the wearing manner of the wireless communication terminal on the user.

SUMMARY

A user often needs to look at a display screen of a first device to switch the mode of the first device to a mode that allows the user to control a second device.

Aspects of non-limiting embodiments of the present disclosure relate to providing the user with a way to switch the mode of a first device to a mode that allows the user to control a second device, without necessarily looking at a display screen of the first device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a non-transitory computer readable medium storing a program causing a computer of a first device to execute a process, the process comprising: switching a mode of the first device to a second mode in response to the first device being worn by a user in a second predetermined orientation, the second mode being a mode which allows the user to control a second device by performing a predetermined motion with a finger of the user.

BRIEF DESCRIPTION OF THE DRAWINGS

Exemplary embodiments of the present disclosure will be described in detail based on the following figures, wherein:

FIGS. 7A and 7B are top views of an exemplary first device and a finger wearing the first device as seen from the direction indicated by the arrow VII in FIG. 6;

FIG. 8 illustrates another manner in which the first exemplary device is worn by a user;

FIGS. 9A through 9H illustrate the motion of a finger;

DETAILED DESCRIPTION

Exemplary embodiments of the disclosure will be described below with reference to the accompanying drawings.

Figure 1:
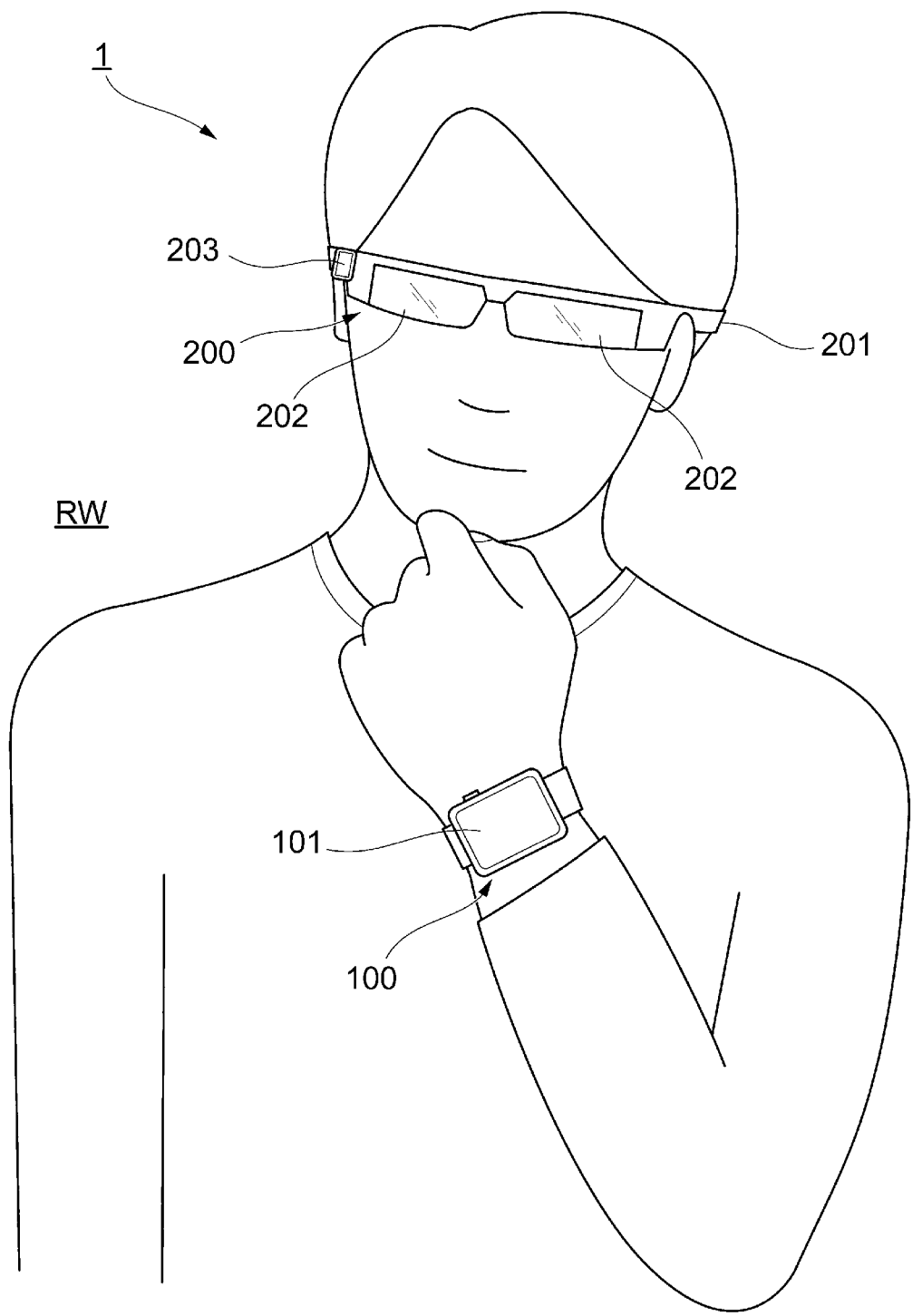
FIG. 1 illustrates an example of a processing system including exemplary first and second devices.

FIG. 1 illustrates an example of a processing system 1 according to an exemplary embodiment.

The processing system 1 includes a first device 100 and a second device 200. The first device 100 is worn by a user and receives an operation performed by the user. The second device 200 is connected to the first device 100 via a communication line, which is not shown.

The communication line for connecting the first device 100 and the second device 200 is not restricted to a particular line and may be a wired communication network or a wireless communication network.

In an exemplary embodiment, when the first device 100 is set to a second mode (which will be discussed later), a user can control the second device 200 by performing a predetermined motion at the first device 100.

When the first device 100 is set to a first mode, the user is unable to control the second device 200 by performing the predetermined motion at the first device 100.

Each of the first device 100 and the second device 200 is a wearable device worn by a user.

The first device 100 may for example be a wrist-worn device such as a watch. The first device 100 includes a display 101. In an embodiment, the display 101 serves, not only as a display for displaying a screen, but also as an input unit for receiving input from a user touching a touchscreen of the display 101. In other words, the display 101 is a touchscreen display.

At the first device 100, the display 101 may display, for example, the time and a menu screen presenting icons of applications installed in the first device 100. When an application is executed, the display 101 displays a corresponding application screen.

In an exemplary embodiment, both of the first device 100 and the second device 200 may be worn by the same user. In another exemplary embodiment, the first device 100 and the second device 200 may be worn by different users.

The second device 200 may not be necessarily a device that is worn by a user. The second device 200 may be a device that is disposed separately from the user. For example, the second device 200 may be a laptop personal computer or a television set.

In an exemplary embodiment, a user is provided with a way to control the second device 200 via the first device 100.

The second device 200 may for example be an augmented reality (AR) display device that displays an image on an object in a real-world space that is being seen by a user.

The second device 200 may come in various forms including non-limiting examples of an eyeglass-type device with mounting portions 201 to be mounted on the ears of a user, a head-mounted device mounted on the head, and a contact-lens-type device worn on the eyeball of a user.

In an exemplary embodiment, the second device 200 includes a display 202 that presents information to a user.

The display 202 is placed in front of the eyeballs of the user. The second device 200 may be configured such that at least part of the second device 200 is disposed in front of the eyeballs of the user when the second device 200 is worn by the user.

The display 202 may be transparent so that the user can see a view in front of the user through the display 202. In other words, the user can see a view behind a transparent portion through the transparent portion.

That is, the user can see a view of a real-world space RW behind the display 202 through the display 202.

When the second device 200 displays information, such as text and images on the display 202 that is transparent, the information is superimposed on the real-world space RW that is located behind the display 202 and is being seen by the user.

The second device 200 also includes a speaker (not shown) for outputting sound and operation buttons (not shown) for receiving an instruction from the user.

The second device 200 also includes a camera 203 that obtains image data of a view in front of the user. In other words, the camera 203 captures image data of the real-world space RW that is being seen by the user through the display 202.

The second device 200 also includes a sensor (not shown), such as an electroencephalograph (brain wave meter), for measuring information about the user.

Figure 2:
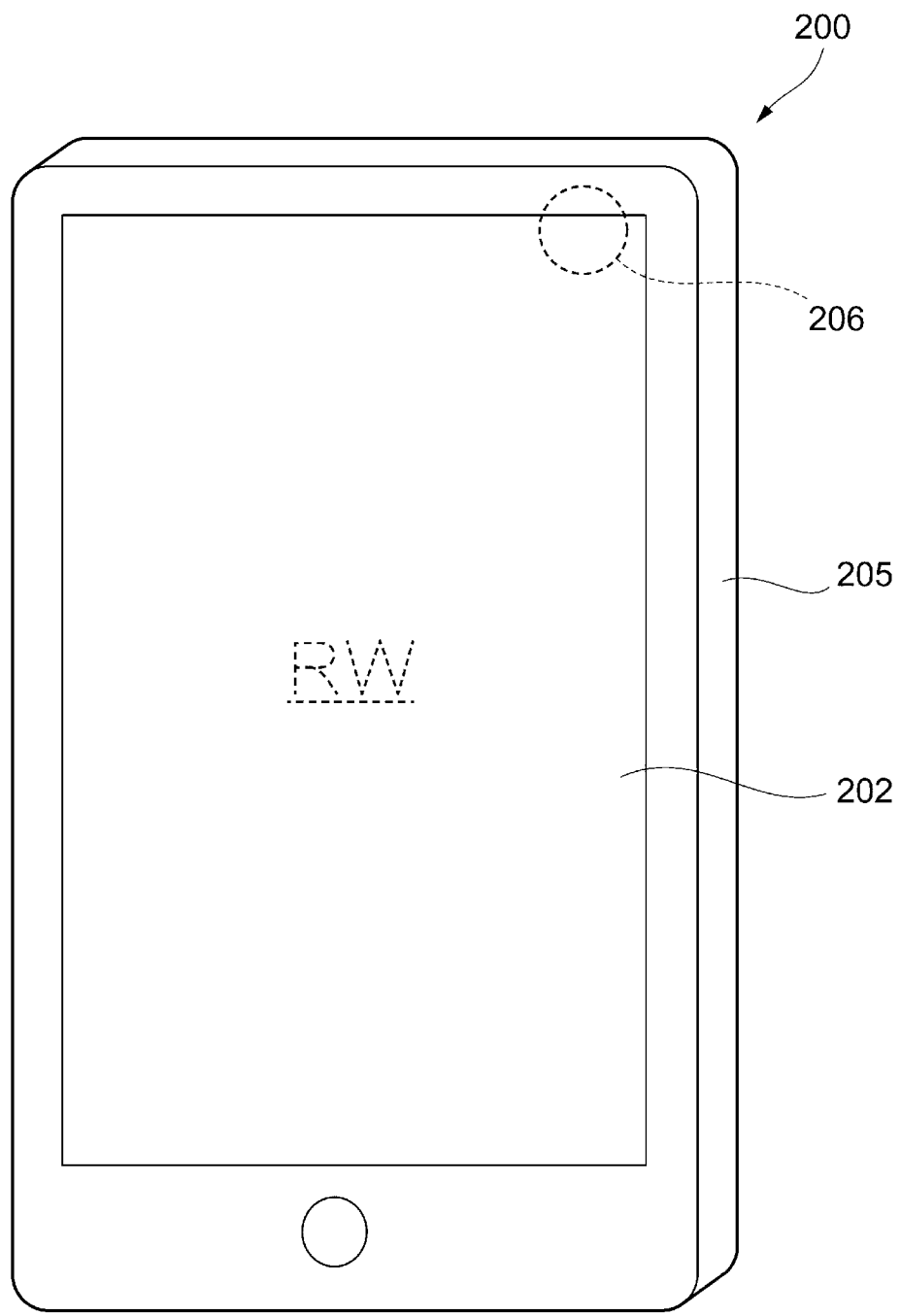
FIG. 2 illustrates a configuration example of another exemplary second device.

Another exemplary second device 200 is a tablet device, as shown in FIG. 2.

In the exemplary second device 200 shown in FIG. 2, a display 202 is provided on one surface of a planar housing 205. The second device 200 includes a camera 206 that obtains image data of a view behind the display 202.

In this case, a user can still see what is behind the display 202 even though the display 202 is not transparent.

More specifically, the second device 200 obtains the image data of the view behind the display 202 using the camera 206 and displays the image data on the display 202.

The user can see the view behind the display 202 by looking at this image data displayed on the display 202.

When the display 202 superimposes information, such as text and images on the image data obtained by the camera 206, the information is superimposed on the real-world space RW that is located behind the display 202 and is being seen by the user.

With the second device 200 shown in FIG. 2, an additional part (not shown) may be separately provided to hold the second device 200 in front of the eyeballs of a user. In other words, the provision of an additional part allows the user to wear the second device 200 on the head of the user so that the second device 200 is held in front of the user's face.

In an exemplary embodiment, the second device 200 can be controlled via the first device 100. Non-limiting examples of controls of the second device 200 include display control to control what is being displayed on the second device 200, driving control to control a physically moving portion of the second device 200, and sound control to control sound played at the second device 200.

The first device 100 (see FIG. 1) is a multifunction device having various functions.

The first device 100 has applications installed. The first device 100 can execute various functions by having the user to select and execute applications installed in the first device 100. Non-limiting examples of applications that may be pre-installed or installed by a user as desired in the first device 100 include email, address book, calendar, web browser, social networking service (SNS) (or social media), maps, payment, and health care applications.

A device that is worn on a wrist of a user, like a watch, to display the time and also to install and execute such applications may hereinafter referred to as a "smartwatch".

In an exemplary embodiment, the first device 100 and the second device 200 can execute various functions in collaboration with each other.

For example, information obtained by the first device 100 may be displayed on the display 202 of the second device 200.

For more specific example, the heart rate and the blood oxygen level are respectively measured by a heart rate meter and a blood oxygen meter provided in the first device 100, and the measurement results can be displayed on the display 202 of the second device 200.

The user controls the first device 100 while looking at the display 202 of the second device 200 presenting the display screen of the first device 100.

More specifically, looking at the display 202 of the second device 200 presenting the display screen of the first device 100, the user selects and starts an application installed in the first device 100.

Displaying the display screen of the first device 100 on the second device 200 allows the user to control the first device 100 while looking at the display 202 of the second device 200.

The user may control the first device 100 to start a health application installed in the first device 100 for managing the heart rate and the blood oxygen level that are being measured at the first device 100 without having to look at the first device.

In an exemplary embodiment, the user can control the first device 100 by selecting any display element(s) displayed on the display 202 as if they were floating in the air.

The operation performed by the user on the display element can be detected by analyzing image data obtained by the camera 203 of the second device 200.

More specifically, as a result of analyzing the image data to detect the position of a finger of the user performing the operation on the display element, the operation of the user for the display element can be detected.

Alternatively, the operation performed by the user on the display element may be detected by determining an operation of the user on a physical button disposed on the second device 200.

When information about the operation of the user on the display element is obtained, the display screen corresponding to the operation specified by this information is displayed on the display 202 of the second device 200.

For example, when the user operates the display element to select the application for managing the heart rate and the blood oxygen level that is being measured, the display screen corresponding to this application is displayed on the display 202 of the second device 200.

Then, the measurement result of the heart rate and the blood oxygen level is displayed on the display 202 of the second device 200.

The display screen of the first device 100 is displayed on the display 202 of the second device 200 in this manner. This enables the user to view information displayed on the first device 100 without looking at the first device 100.

In another example, when the user makes a payment with electronic money by using the first device 100, information about this payment is displayed on the second device 200. For example, information about the payment amount, the success or failure of the payment transaction, and the balance after the payment is made is displayed on the display 202 of the second device 200.

In another example, notification that the first device 100 has received e-mail is displayed on the display 202 of the second device 200. That is, the user can recognize that the first device 100 has received e-mail without looking at the first device 100.

For example, if an e-mail notification function in the first device 100 is ON, notification that the first device 100 has received e-mail is displayed on the display 202 of the second device 200.

More specifically, when the user has selected a display element displayed on the display 202 of the second device 200 or an object that the user is viewing through the display 202, information about the selected display element or object is sent to the first device 100 via e-mail, for example.

In this case, information that the first device 100 has received e-mail is displayed on the display 202 of the second device 200.

This enables the user to recognize that the first device 100 has received e-mail about the display element or object selected by the user without looking at the first device 100.

In another example, when the user has purchased a product displayed on the display 202 of the second device 200 or a product that the user is viewing through the display 202, information about this purchase is sent to the first device 100.

This enables the user to make a payment for the product by using a payment function of the first device 100. For example, the user can make a payment by using a near field communication (NFC) or quick response (QR)-code (registered trademark)/barcode payment function of the first device 100.

More specifically, when the user has purchased a product displayed on the display 202 of the second device 200 or a product that the user is viewing through the display 202, the total amount for the purchase is calculated by a server (not shown). Then, information on the total amount is sent to the first device 100.

The user then makes a payment for the final amount determined by this total amount by using a payment function of the first device 100.

The user performs the above-described purchase processing by viewing the display 202 of the second device 200. For example, the user selects a display element displayed on the display 202 as if it were floating in the air.

In another example, the measurement result obtained by the brain wave meter provided in the second device 200 may be sent to the first device 100 and be displayed using a certain application installed in the first device 100.

In another example, when the user selects a store by operating the second device 200, information about this store may be sent to the first device 100 and be displayed on the first device 100.

More specifically, information about a store or a restaurant displayed on the display 202 or a store or a restaurant that the user is viewing through the display 202 is sent to the first device 100 and is displayed on the first device 100.

Figure 3:
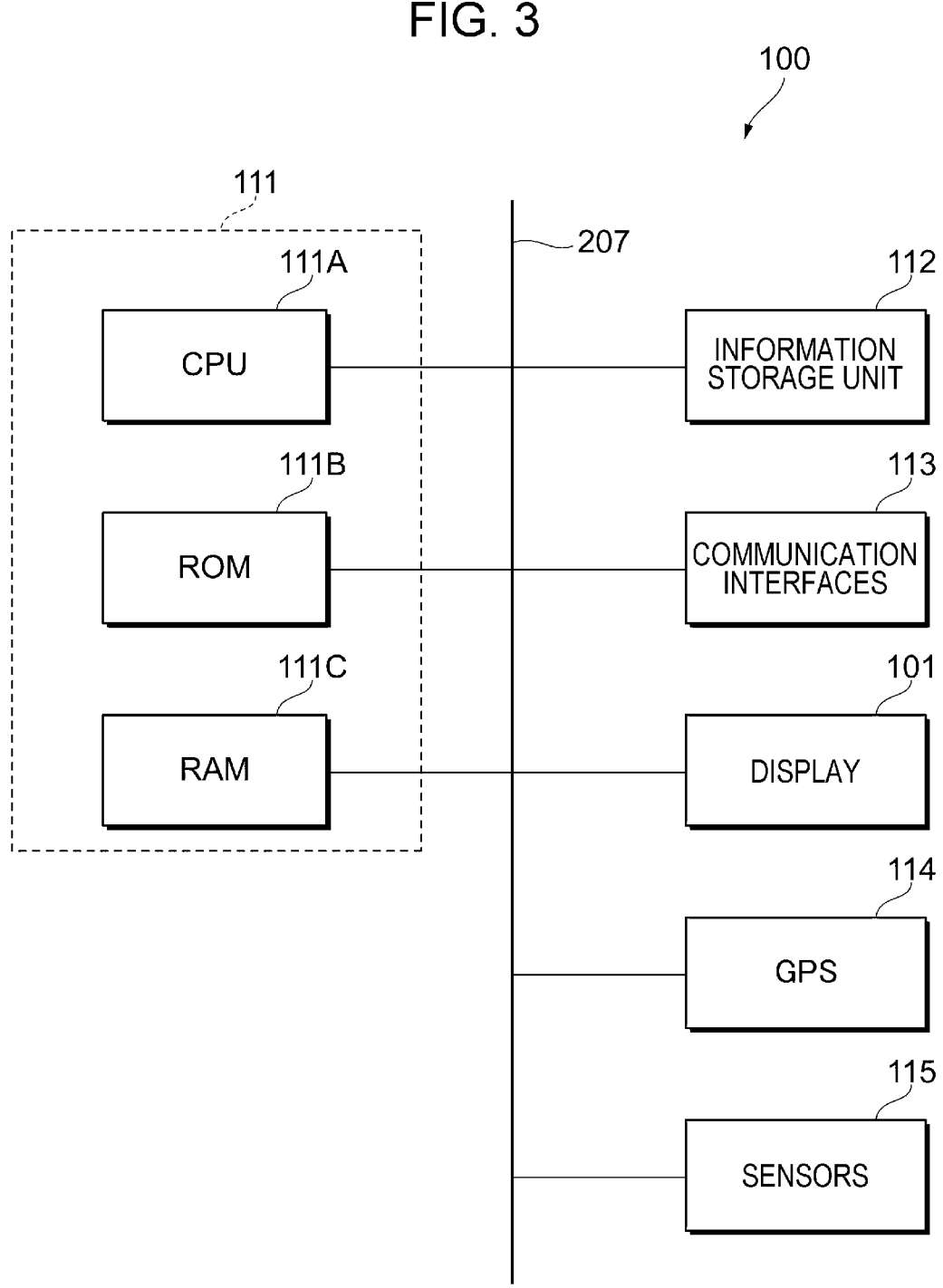
FIG. 3 is a block diagram illustrating an example of the hardware configuration of an exemplary first device.

FIG. 3 is a block diagram illustrating an example of the hardware configuration of an exemplary first device 100. The example in FIG. 3 is the hardware configuration when the first device 100 is a wrist-worn device.

The first device 100 includes a control unit 111, an information storage unit 112, various communication interfaces 113, a display 101, a global positioning system (GPS) 114, and various sensors 115. The control unit 111 controls the entirety of the first device 100. The information storage unit 112 stores data. The communication interfaces 113 are compliant with wireless communication standards. The display 101 is a liquid crystal display or an organic electroluminescence (EL) display, for example, and displays information.

The control unit 111 includes a central processing unit (CPU) 111A, a read only memory (ROM) 111B, and a random access memory (RAM) 111C. The CPU 111A is an example of a processor. In the ROM 111B, firmware and basic input/output system (BIOS) are stored. The RAM 111C is used as a work area.

The communication interfaces 113 are used for communication with another device, such as the second device 200.

The display 101 is constituted by a touchscreen, which can detect a user operation performed on the display 101.

The GPS 114 receives radio waves from a GPS satellite and detects the position of the first device 100. The current position of the first device 100 is detected based on information on the latitude, longitude, and altitude output from a GPS sensor of the GPS 114.

The sensors 115 include a sensor for detecting a user operation on the first device 100 and a sensor for obtaining information about the user, such as the blood pressure. The sensors 15 also include a sensor for detecting the orientation of the first device 100 and a sensor for detecting the illuminance of the first device 100.

A program to be executed by the CPU 111A may be recorded on a computer readable recording medium, such as a magnetic recording medium (magnetic tape and a magnetic disk, for example), an optical recording medium (an optical disc, for example), a magneto-optical recording medium, and a semiconductor memory, and be provided to the first device 100.

A program to be executed by the CPU 111A may be provided to the first device 100 via a communication medium, such as the internet.

Figure 4:
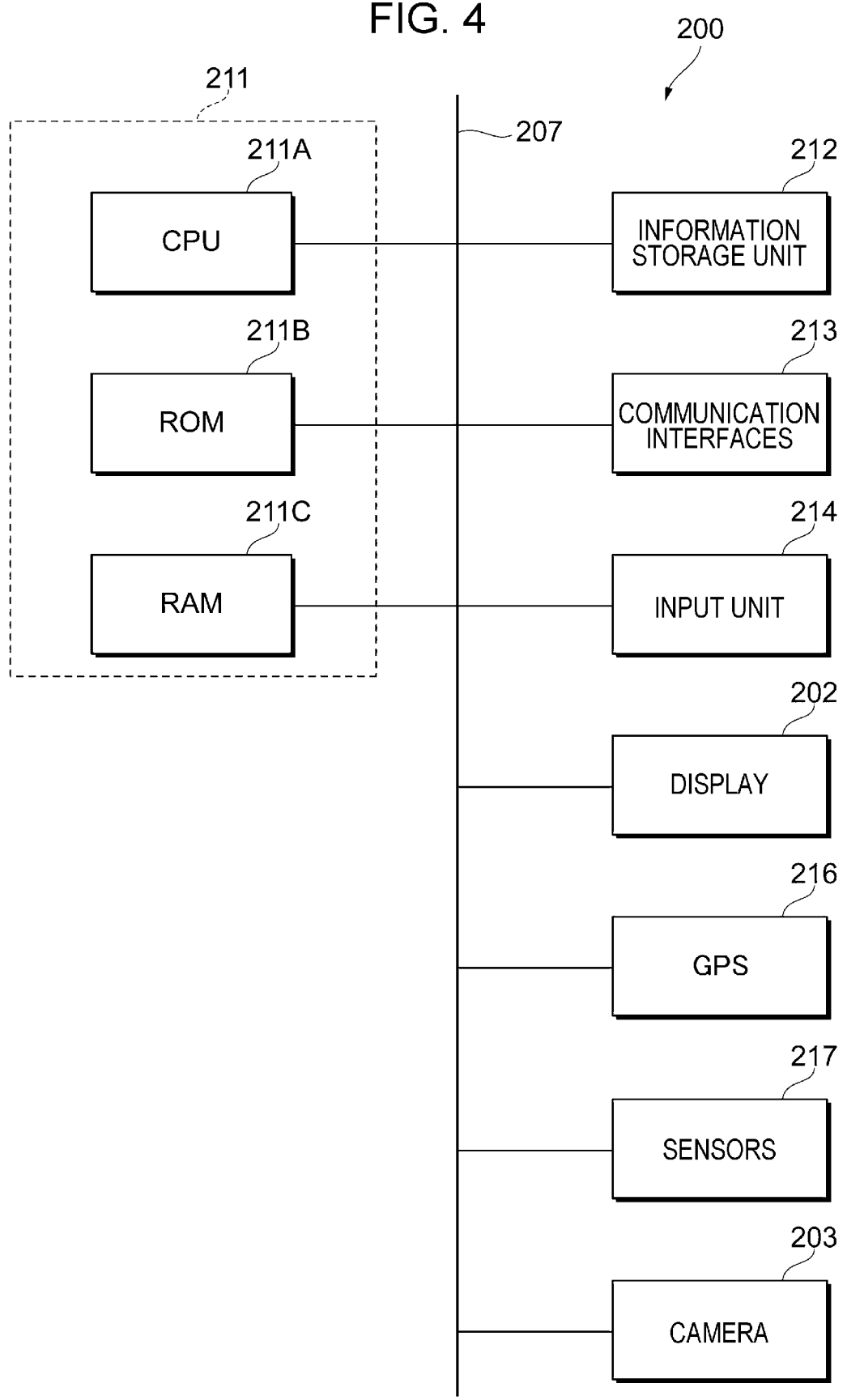
FIG. 4 is a block diagram illustrating an example of the hardware configuration of an exemplary second device.

FIG. 4 is a block diagram illustrating an example of the hardware configuration of an exemplary second device 200. The example in FIG. 4 is the hardware configuration when the second device 200 is a glasses-type device.

The second device 200 includes a control unit 211, an information storage unit 212, various communication interfaces 213, an input unit 214, a display 202, a GPS 216, sensors 217, and a camera 203. The control unit 211 controls the entirety of the second device 200. The information storage unit 212 stores various items of data. The communication interfaces 213 are compliant with wireless communication standards. The input unit 214 is a touch sensor or a button, for example. The display 202 is a liquid crystal display or an organic EL display, for example, and displays information.

The control unit 211 includes a CPU 211A, which is an example of the processor, a ROM 211B in which firmware and BIOS are stored, and a RAM 211C used as a work area.

The communication interfaces 213 are used for communication with another device, such as the first device 100.

The GPS 216 receives radio waves from a GPS satellite and detects the position of the second device 200. The current position of the second device 200 is detected based on information on the latitude, longitude, and altitude output from a GPS sensor of the GPS 216.

The sensors 217 include various sensors for detecting information about a user, such as the brain waves, body temperature, and heart rate.

The camera 203 obtains image data of a view of the real-world space RW in front of a user wearing the second device 200. In other words, the camera 203 obtains image data of a view of the real-world space RW that is ahead of the user and is being seen by the user.

A program to be executed by the CPU 211A may be recorded on a computer readable recording medium, such as a magnetic recording medium (magnetic tape and a magnetic disk, for example), an optical recording medium (an optical disc, for example), a magneto-optical recording medium, and a semiconductor memory, and be provided to the second device 200.

A program to be executed by the CPU 211A may be provided to the second device 200 via a communication medium, such as the internet.

The first device 100 and the second device 200 are not limited to a combination of a wrist-worn device and a glasses-type device. The first device 100 may be a smartphone and the second device 200 may be a glasses-type device, for example.

In the embodiments of the disclosure, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments of the disclosure, the term "processor" is broad enough to encompass one processor or plural processors in collaboration which are located physically apart from each other but may work cooperatively. The order of processes performed by the processor is not limited to one described in the embodiments and may be changed.

Figure 5B:
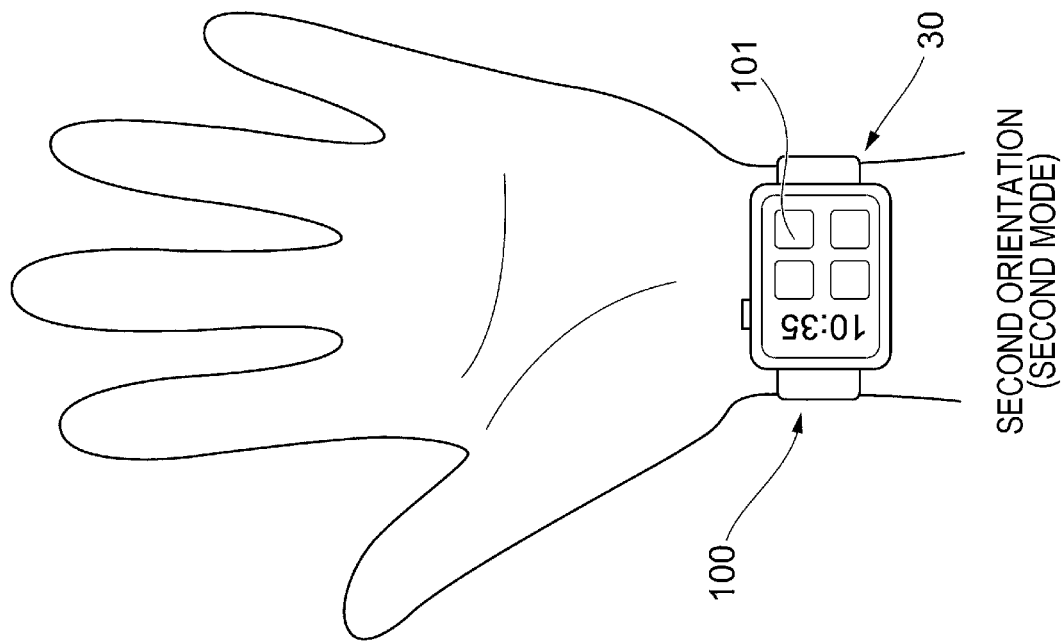
FIGS. 5A and 5B illustrate manners in which an exemplary first device is worn by a user.
Figure 5A:
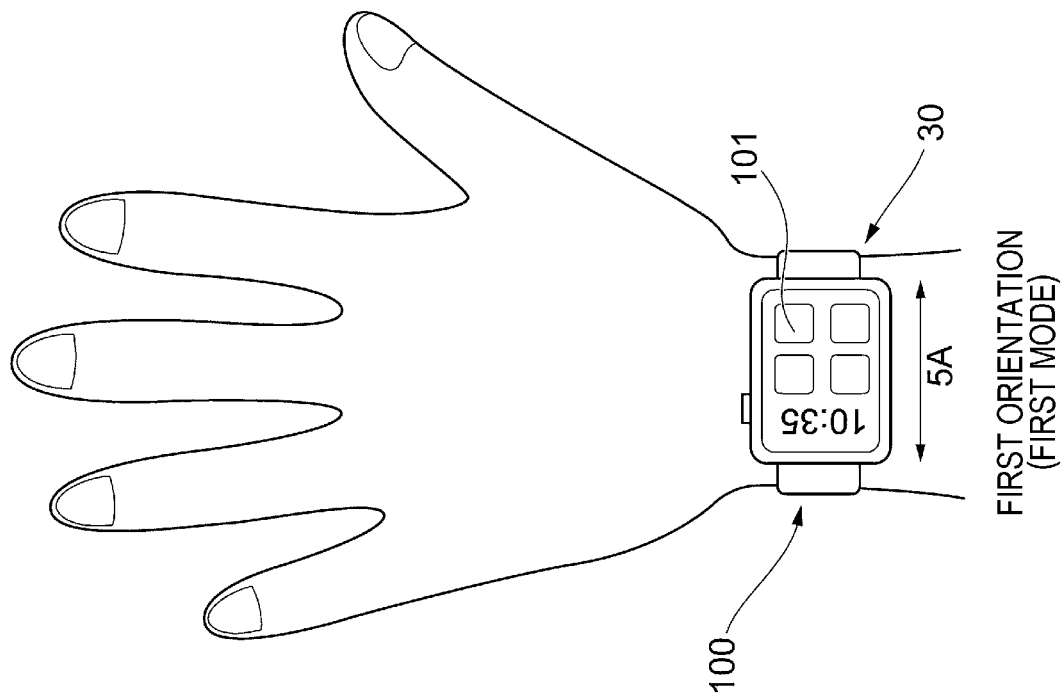

FIGS. 5A and 5B illustrate different manners in which an exemplary first device 100 is worn by the user.

In the examples in FIGS. 5A and 5B, the first device 100 is worn on a wrist of the user, which is an example of a mounting part 30 of the user. The first device 100 worn on the wrist can also be regarded as a device worn on an arm, or a hand of the user.

The first device 100, which is worn on the mounting part 30, is rotatable about the mounting part 30. More specifically, the first device 100 is rotatable in the directions indicated by the double-headed arrow 5A in FIG. 5A.

In an exemplary embodiment, rotating the first device 100 changes the orientation of the first device 100.

In other words, the orientation of the first device 100 is changed as a result of the first device 100 being rotated about the mounting part 30. In an exemplary embodiment, the orientation of the first device 100 can be changed without removing the first device 100 from the mounting part 30, that is, the orientation of the first device 100 can be changed while the first device 100 is worn on the mounting part 30.

In response to the first device 100 being worn on the mounting part 30 of the user in a predetermined orientation, which is a second orientation, the CPU 111A (see FIG. 3) of the first device 100 changes the mode of the first device 100 from a first mode to a second mode.

In an exemplary embodiment, the correspondence between the orientations of the first device 10 and the modes thereof may be informed to a user for example by a user instruction manual.

This correspondence allows the user to put the first device 100 in a specific mode by wearing the first device 100 in a specific orientation associated with the specific mode.

FIG. 5B illustrates a manner in which the first device 100 is worn on the wrist of the user in the second orientation. In an exemplary embodiment, in response to the first device 100 being worn by the user in the second orientation, the first device 100 is switched from the first mode to the second mode.

The second mode is a mode in which the user is allowed to control the second device 200 (see FIG. 1) with a predetermined motion of a finger of the user. In other words, the second mode is a mode in which the user is allowed to control the second device 200 via the first device 100.

In response to the first device 100 being worn on the mounting part 30 of the user in the second orientation, the CPU 111A of the first device 100 switches the first device 100 from the first mode to the second mode that allows the user to control the second device 200 with a predetermined motion of a finger.

In other words, in response to the orientation of the first device 100 being changed from a first orientation, which is different from the second orientation, to the second orientation, the CPU 111A switches the first device 100 from the first mode associated with the first orientation to the second mode associated with the second orientation.

FIG. 5A illustrates a manner in which an exemplary first device 100 is worn on the mounting part 30 of the user in the first orientation. When the first device 100 is worn in this manner, the CPU 111A sets the first device 100 in the first mode.

When the orientation of the first device 100 is changed from the first orientation to the second orientation, the CPU 111A shifts the mode of the first device 100 from the first mode associated with the first orientation to the second mode associated with the second orientation.

In response to the user performing an operation on the first device 100 in the second mode, control information for controlling the second device 200 (see FIG. 1), for example, is generated in the first device 100 and is sent to the second device 200.

More specifically, when the user performs an operation on the display 101 of the first device 100 in the second mode by touching the display 101 (touchscreen) of the first device 100, control information for controlling the second device 200 is generated in the first device 100 and is sent to the second device 200.

When the user performs an operation on the display 101 of the first device 100 in the second mode, information indicating the content of this operation is sent from the first device 100 to the second device 200.

In this case, the CPU 211A (see FIG. 4) of the second device 200 controls the second device 200, based on the information indicating the content of the operation.

This way, the user is able to control the second device 200 by performing an operation on the first device 100.

The first mode is not a mode for letting a user control the second device 200, but a mode for letting the user control the first device 100.

When the first device 100 is in the first mode, a menu screen indicating icons of applications installed in the first device 100 and application screens are displayed on the display 101. The user gives an instruction to execute the function of one of the applications installed in the first device 100 via a user interface (UI) element, such as a button, displayed on the display 101.

The second mode is a mode for allowing a user to control the second device 200 via the first device 100.

When the user performs an operation on the display 101 of the first device 100 in the second mode, processing corresponding to the operation is executed in the second device 200. For example, the display content on the display 202 (see FIG. 1) of the second device 200 may be changed.

The user may still be able to operate the first device 100 when the first device 100 is in the second mode.

For example, when the first device 100 is in the second mode, the second device 200 may be controlled in response to the user performing a predetermined operation, while the first device 100 may be controlled in response to the user performing a different predetermined operation.

In an exemplary embodiment, the operation performed by the user is received by the display 101. However, the operation of the user may be received by another part of the first device 100, such as a belt for attaching the display 101 to the wrist of the user.

When the orientation of the first device 100 is no longer in the second orientation, the CPU 111A of the first device 100 may switch the mode of the first device 100 from the second mode to a previous mode before the second mode. The previous mode may be the first mode for controlling the first device 100.

When the mode of the first device 100 returns to the first mode, the user becomes unable to control the second device 200 via the first device 100.

As shown in FIG. 5A, when the first device 100 is worn by the user in a manner where the display 101 is disposed on the side opposite the palm (hereinafter referred to as back-side) of the hand, the first device 100 operates in the first mode and functions as a smartwatch.

As shown in FIG. 5B, when the first device 100 is worn by the user in a manner where the display 101 is disposed on the palm-side of the hand, the first device 100 operates in the second mode and functions as a remote controller for controlling the second device 200.

When the display 101 of the first device 100 is located on the back-side of the hand, the first device 100 is set to the first mode. When the display 101 of the first device 100 is located on the palm side of the hand, the first device 100 is set in the second mode.

The above correspondence between the orientations and the modes is a non-limiting example. For another example, when the display 101 of the first device 100 is located on the palm-side of the hand, the first device 100 may be set to the first mode, whereas, when the display 101 of the first device 100 is located on the back-side of the hand, the first device 100 may be set to the second mode.

The correspondence between the modes and the orientations of the first device 100 may be set by the user.

For example, when the orientation of the first device 100 is a first orientation set by the user, the first device 100 is set to the first mode. When the orientation of the first device 100 is a second orientation set by the user, the first device 100 is set to the second mode.

The correspondence between the modes and the orientations of the first device 100 may be determined based on the usage situation of the first device 100 by the user.

For example, as the usage situation of the first device 100, the first device may obtain information about how often the first device 100 is worn in which orientation. Then, the orientation in which the first device 100 is worn at a first frequency may be set to be the first orientation, whereas the orientation in which the first device 100 is worn at a second frequency that is lower than the first frequency may be set to be the second orientation.

The CPU 111A of the first device 100 changes, depending upon whether the first device 100 is worn on the mounting part 30 of the user in a first manner or in a second manner different from the first manner, the content of processing to be executed by a predetermined user gesture performed for the first device 100.

More specifically, changes, depending upon whether the first device 100 is worn on the mounting part 30 of the user as shown in FIG. 5A or as shown in FIG. 5B, the CPU 111A changes the content of the processing.

In an exemplary embodiment, when the first device 100 is worn on the mounting part 30 as shown in FIG. 5B, the CPU 111A of the first device 100 controls the second device 200 based on a predetermined user gesture performed on the display 101 of the first device 100.

When the first device 100 is worn on the mounting part 30 as shown in FIG. 5A, the CPU 111A controls the first device 100 instead of the second device 200, based on the predetermined user gesture performed on the display 101 of the first device 100.

Figure 6:
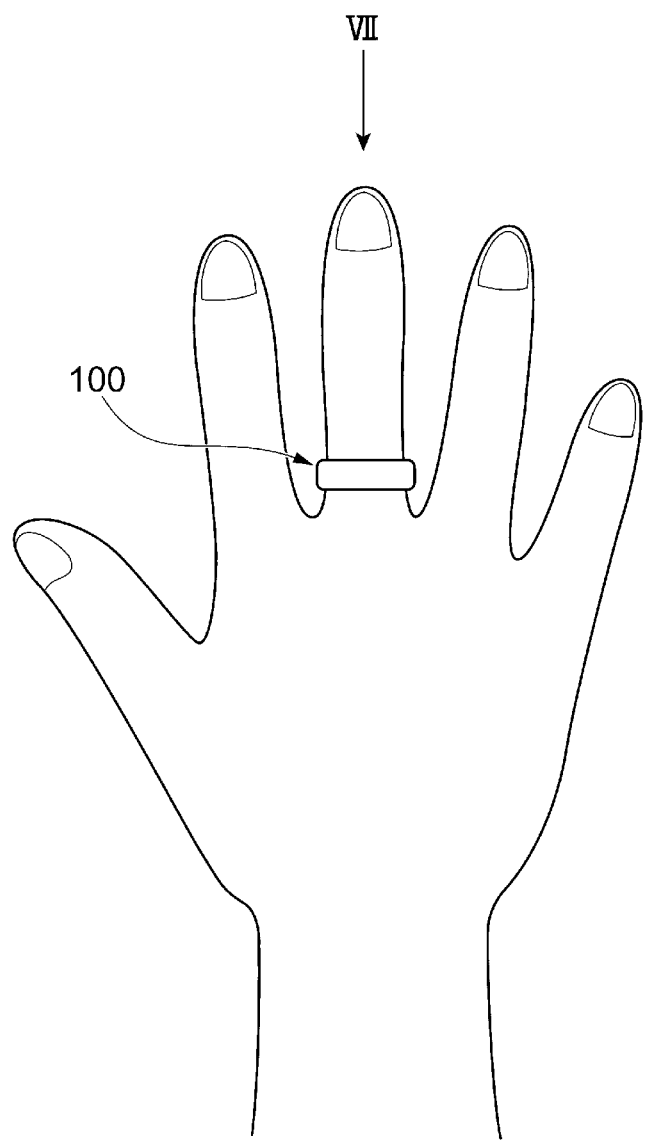
FIG. 6 illustrates another configuration example of an exemplary first device.

FIG. 6 illustrates another configuration example of an exemplary first device 100.

In this example, the first device 100 is a smart ring, which has a shape of a ring that is worn on a finger of a user. The first device 100 is rotatable about the finger wearing the first device.

When the first device 100 is worn by the user in such manner that a specific part of the first device 100 is disposed in a specific direction, the first device 100 enters a second mode in which a remote controller for operating the second device 200.

When the first device 100 is worn by the user in such manner that the specific part is not disposed in the specific direction, the first device 100 enters a first mode that is different from the second mode. For example, the first mode may be a power-OFF state.

The first mode may not necessarily be the power-OFF state; the first mode may be a mode where biological information of the user is obtained.

FIGS. 7A and 7B are top views of an exemplary first device 100 and a finger wearing the first device 100 as seen from the direction indicated by the arrow VII in FIG. 6.

In the example shown in FIGS. 6, 7A, and 7B, when the ring-like first device 100 is worn on the finger of the user in the second orientation, it is set to the second mode.

More specifically, as shown in FIG. 7A, when the first device 100 is worn on the finger of the user such that a specific part 119 is positioned on the side of the palm, the first device 100 enters the second mode.

As shown in FIG. 7B, when the first device 100 is worn on the finger of the user such that the specific part 119 is positioned on the back-side of the hand, the first device 100 enters the first mode.

The orientations of the first device 100 described in FIGS. 7A and 7B and their correspondences to the modes are non-limiting examples and other orientations and correspondences are also possible.

For example, the first device 100 may enter the first mode when the first device 100 is worn on the finger of the user such that the specific part 119 is positioned on the palm-side of the hand, and may enter the second mode when the first device 100 is worn on the finger of the user such that the specific part 119 is positioned on the back-side of the hand.

For another example, as shown in FIG. 8, when the first device 100 is worn on a finger of the user such that the specific part 119 is positioned between the finger and its adjacent finger, the first device 100 may be set to the second mode.

When the ring-like first device 100 is in the second mode, the motion of a finger wearing the first device 100 is detected by an acceleration sensor, for example, provided in the first device 100.

In an exemplary embodiment, the user moves the finger as shown in FIGS. 9A through 9H. The motion of the finger is detected, for example, by the acceleration sensor, and the second device 200 is controlled based on the detection result.

When the user moves the finger wearing the first device 100 to the right side, as shown in FIG. 9A, the display 202 (see FIG. 1) of the second device 200 is scrolled to the right.

When the user moves the finger wearing the first device 100 to the left side, as shown in FIG. 9B, the display 202 of the second device 200 is scrolled to the left.

When the user moves the finger wearing the first device 100 downward, as shown in FIG. 9C, the display 202 of the second device 200 is scrolled down.

When the user moves the finger wearing the first device 100 upward, as shown in FIG. 9D, the display 202 of the second device 200 is scrolled up.

When the user rotates the finger wearing the first device 100 in a first direction, as shown in FIG. 9E, the focusing of a display element is switched from one display element to another display element on the display 202 of the second device 200. The second display element may for example be the subsequent display element (right adjacent display element, for example) is focused. In other words, when the user rotates the finger wearing the first device 100 in a particular direction, the display element on which a pointer, such as a cursor, is placed can be changed.

When the user rotates the finger wearing the first device 100 in a second direction opposite the first direction, as shown in FIG. 9F, the focusing of a display element is switched to the previous display element (left adjacent display element, for example) on the display 202 of the second device 200.

When the user moves the finger wearing the first device 100 toward an adjacent finger to hit the adjacent finger, as shown in FIG. 9G, a display element, such as an icon, is selected on the display 202 of the second device 200.

More specifically, a display element displayed on the display 202 with a pointer, such as cursor, placed thereon is selected. This motion may correspond to a single-click on the display element.

If the selected display element represents a file, a preview image of the file may be displayed.

When the user moves the finger wearing the first device 100 toward the adjacent finger to hit the adjacent finger twice, as shown in FIG. 9H, the selection of a display element, such as an icon, may be confirmed.

More specifically, a display element displayed on the display 202 with a pointer, such as cursor, placed thereon is confirmed as a display element selected by the user. This motion may correspond to a double-click on the display element.

If the selected display element represents a file, the file is opened.

Selecting and confirming of a display element may not necessarily be performed in two steps. The content represented by a display element may be executed when selected.

When the first device 100 is a ring-like device as in this example, the user can control the second device 200 by moving a finger as he/she would do with a trackpad.

The CPU 111A, which is a processor, and one or more sensors may be disposed in the first device 100, and the first device 100 may generate control information and control the second device 200.

Alternatively, as described above, detection results obtained in the first device 100 may be sent to the second device 200, and the second device 200 may control itself based on the detection results.

Figure 10:
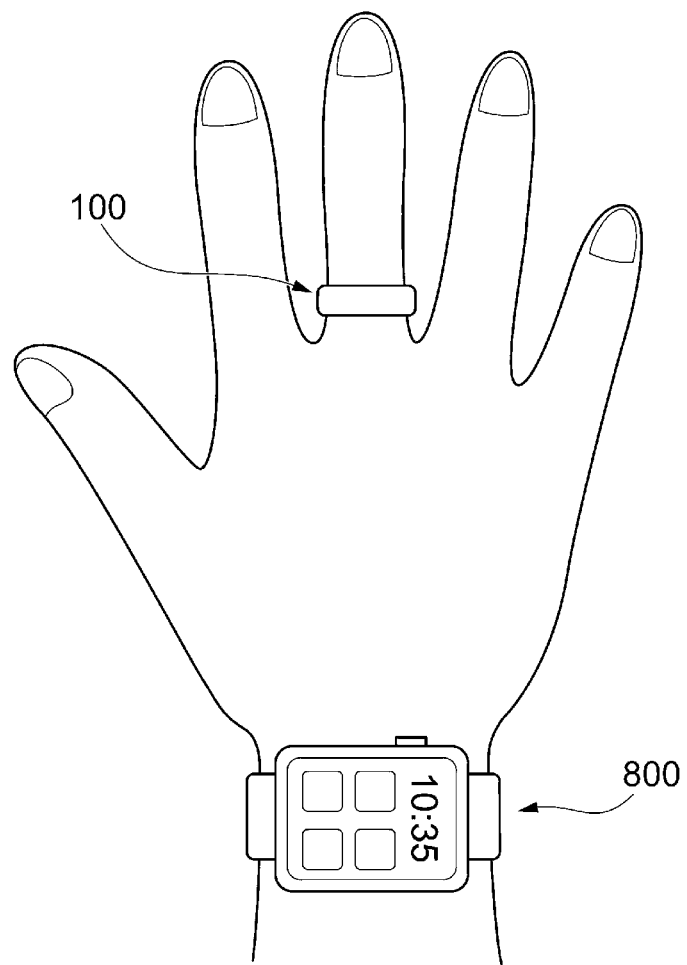
FIG. 10 illustrates another approach to detecting the motion of a finger.

The motion of a finger wearing the first device 100 may be detected by another device 800, as shown in FIG. 10, instead of by the first device 100.

In the example in FIG. 10, an object, such as a magnet or a metal, is disposed in the first device 100, and the motion of this object is detected by the device 800.

The device 800 may be another wearable device, for example, a wrist-wearable device.

More specifically, in the example in FIG. 10, the mode of the device 800 is switched in accordance with the orientation of the first device 100.

When the orientation of the first device 100 is changed to the second orientation, the device 800 is switched from the first mode to the second mode to activate the sensor disposed in the device 800 to detect the motion of the finger wearing the first device. Based on the detection result of the sensor, the second device 200 is controlled.

Figure 11A:
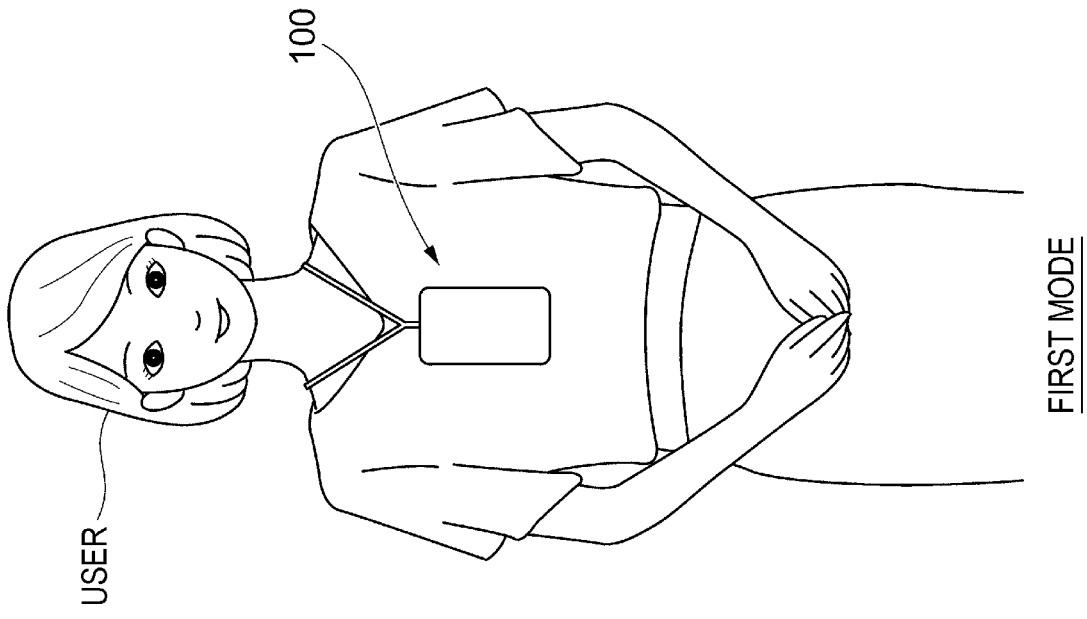
FIGS. 11A and 11B illustrate another configuration example of an exemplary first device.
Figure 11B:
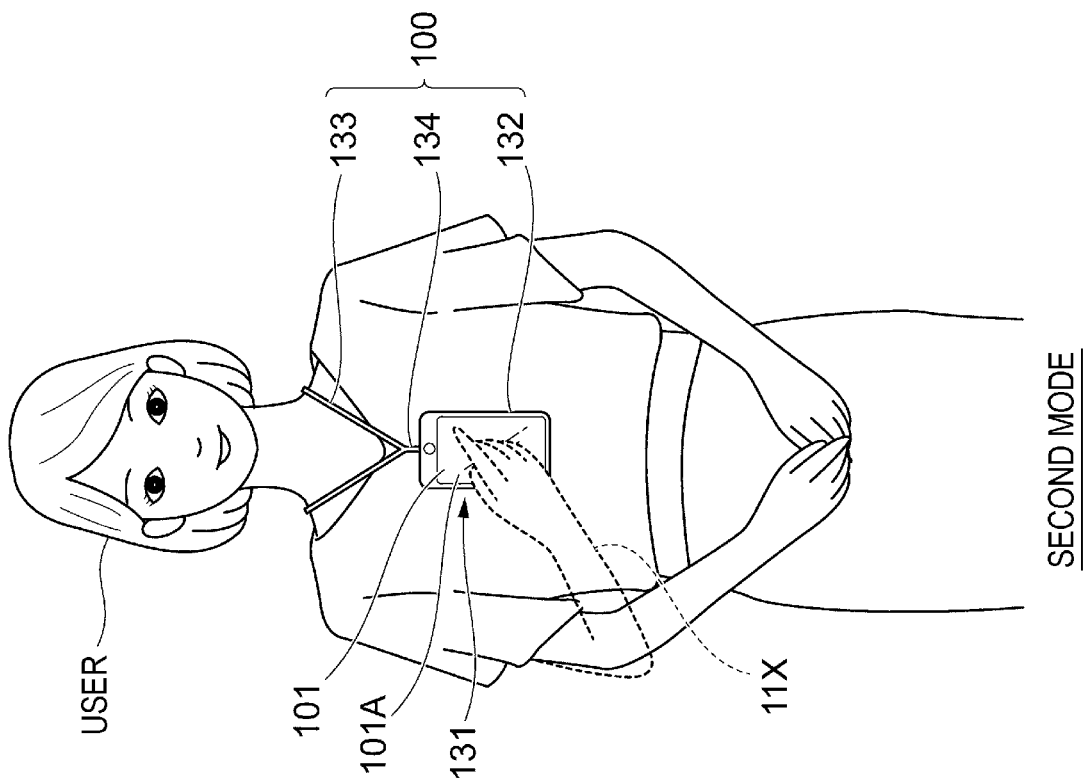

FIGS. 11A and 11B illustrate another configuration example of an exemplary first device 100.

In this example, the first device 100 includes a rotatable portion 131, as shown in FIG. 11A.

The first device 100 includes a smartphone 132 and a strap 133 attached to the smartphone 132. The smartphone 132 has a display 101. On the display 101, a menu screen indicating icons of various applications installed in the smartphone 132 and a selected application screen, such as a display screen 101A, can be displayed.

In this example, the user wears the first device 100 by hanging the first device 100 from his/her neck. The strap 133 forms a loop that goes around his/her neck so that it can be hung from his/her neck.

In this example, a connector 134 connecting the strap 133 and the smartphone 132 allows the smartphone 132 to rotate.

In this example, the orientation of the first device changes as a result of the user rotating the smartphone 132, which is an example of the rotatable portion 131.

When the orientation of the smartphone 132 is changed to a certain orientation as a result of the smartphone 132 being rotated, the first device 100 is switched from the first mode to the second mode.

More specifically, as shown in FIG. 11A, when the display 101 of the smartphone 132 is positioned in the vertical direction and faces away from the user, the first device 100 is set to the second mode.

This enables the user to control the second device 200 (which is not shown in FIG. 11A) by touching the display 101 of the smartphone 132, as indicated by the user's hand in the broken lines 11X in FIG. 11A.

In contrast, as shown in FIG. 11B, when the display 101 (which is unseen in FIG. 11B) of the smartphone 132 is positioned in the vertical direction and faces toward the user, the first device 100 is in the first mode.

The first mode may for example be a sleep mode. When the first device 100 is in the sleep mode, the user is unable to control the second device 200 by performing an operation at the first device. When the first device 100 is in the sleep mode, operation performed by the user on the touchscreen of the display 101 of the first device 100 is disabled, and even if the touchscreen contacts the user, neither of the first device 100 nor the second device 200 will respond.

In this example, when the user lifts the first device 100 in such manner that the display 101 of the first device 100 is in an orientation other than the vertical direction, the first device 100 functions as the smartphone 132, not a remote controller for the second 200. Even if the user touches the display 101 of the first device 100, the second device 200 will not respond.

Another example of the first device 100 is an ID card with a strap.

In the ID card with a strap, a function unit similar to the above-described touchscreen, that is, a function unit for receiving a user operation, is provided on one side of the ID card.

When this function unit faces away from the user, the first device 100 is set to the second mode. When the function unit faces toward the user, the first device 100 is set to the first mode.

Detecting of the orientation of the first device 100 will be explained below.

The orientation of the first device 100 is determined based on output from one of the sensors 115 (see FIG. 3), for example, an illuminance sensor, provided in the first device 100.

For example, in the first device 100 in which the smartphone 132 (see FIGS. 11A and 11B), which is one example of the rotatable portion 131, is rotated, an illuminance sensor is provided in the first device 100, and the orientation of the first device 100 is detected based on output from this illuminance sensor.

In an exemplary embodiment, an illuminance sensor may be provided on the display 101 to measure the illuminance on the outer side of the display 101. In this case, when the first device 100 is worn such that the display 101 is unseen from other people, as shown in FIG. 11B, the measurement value obtained by the illuminance sensor becomes smaller than that when the display 101 is seen for other people, as shown in FIG. 11A. If the measurement value is smaller than a predetermined threshold, it can be determined that the display 101 of the first device 100 faces toward the user. If the measurement value is greater than or equal to the predetermined threshold, it can be determined that the display 101 of the first device 100 faces away from the user.

In an exemplary embodiment, a sensor for detecting the rotation of the smartphone 132 may be disposed at the connector 134 between the strap 133 and the smartphone 132 of the first device 100, and the orientation of the smartphone 132 may be determined based on output from this sensor.

In an exemplary embodiment, the first device 100 may be a wrist-worn device. A sensor for detecting information on the blood vessels on the surface of the wrist of a user may be provided on the inner side of the first device 100, and the orientation of the first device 100 may be determined based on output from this sensor.

Information on the blood vessels on the surface of the palm-side of the wrist and the back-side (side opposite the palm) of the wrist may be obtained and registered in advance.

Then, when the user wears the first device 100 on the wrist, information on the blood vessels on the surface of the wrist may be obtained and checked against the registered information, thereby determining the orientation of the first device 100.

In an exemplary embodiment, the first device 100 may be a ring-like device. A sensor for detecting information on the blood vessels on the surface of a finger of a user may be provided on the inner peripheral surface of the first device 100, and the orientation of the first device 100 may be determined based on output from this sensor.

Information on the blood vessels of the palm-side of the finger and the back-side of the finger may be obtained and registered in advance.

When the user wears the first device 100 on the finger, information on the blood vessels on the surface of the finger may be obtained and checked against the registered information, thereby determining the orientation of the first device 100.

In an exemplary embodiment, the ring-like first device 100 may have a pressure sensor on the outer peripheral surface, and the orientation of the first device 100 is determined based on output from this pressure sensor.

More specifically, a pressure sensor may be disposed at the specific part 119 (see FIG. 8), and the orientation of the first device 100 is determined based on output from this pressure sensor.

When the ring-like device is worn on a finger in such manner that the specific part 119 is positioned between the finger and an adjacent finger as shown in FIG. 8, the ring-like first device 100 may be in the second mode.

When the first device 100 is worn on the finger in the above-described manner, pressure is applied to the pressure sensor provided at the specific part 119, and the pressure sensor can detect that the specific part 119 is sandwiched between two fingers.

That is, the pressure sensor can detect that the specific part 119 is sandwiched between the finger wearing the first device 100 and its adjacent finger.

The first device 100 may be switched from the first mode to the second mode in response to the specific part 119 being sandwiched between the finger wearing the first device 100 and an adjacent finger.

When the specific part 119 is not sandwiched between the finger wearing the first device 100 and its adjacent finger, the pressure applied to the pressure sensor is smaller. In this case, the first device 100 is set to the first mode.

The above-described approaches to detecting the orientation of the first device 100 are non-limiting examples. Other types of sensors, such as a gravity sensor, a tilt sensor, and an acceleration sensor, and/or other known techniques may be used to detect the orientation of the first device 100.

Figure 12:
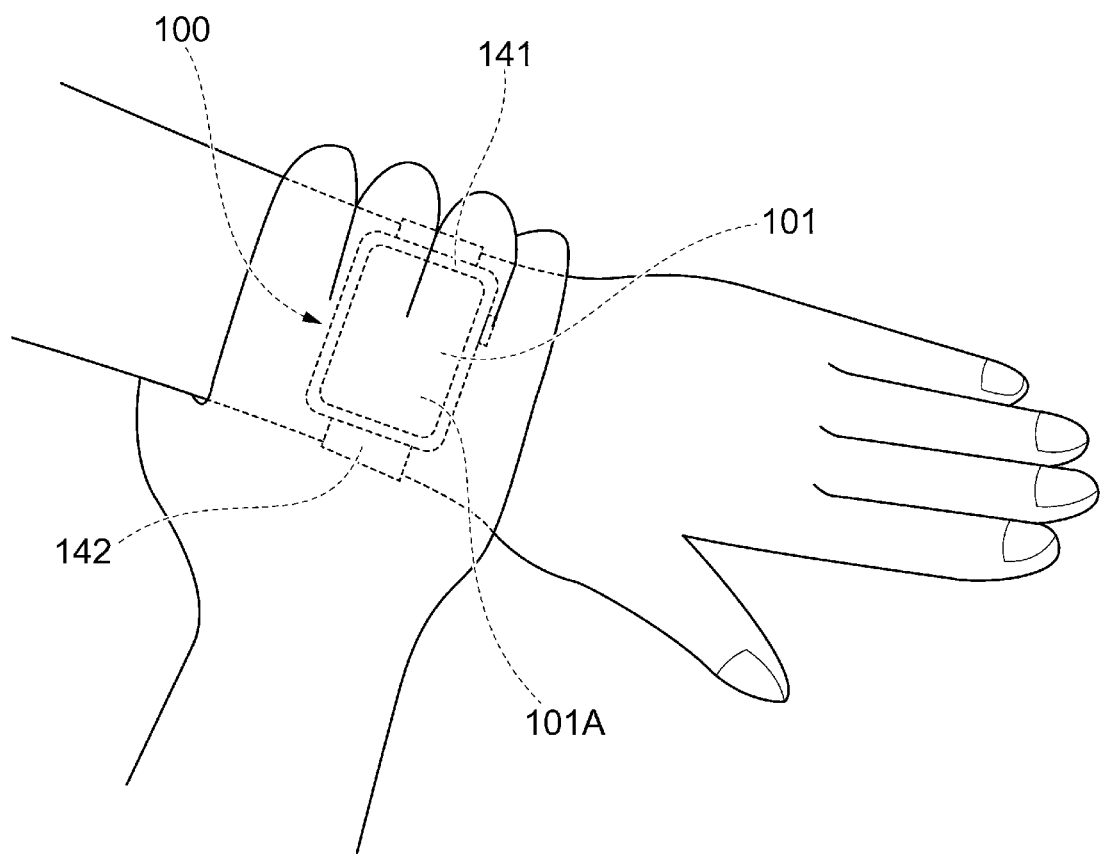
FIG. 12 illustrates an exemplary first device.

FIG. 12 illustrates another exemplary first device 100.

To switch the mode of the first device 100, a user may cover the outer side of the first device 100 worn on the user, as shown in FIG. 12.

In response to the user having covered the outer side of the first device 100, the CPU 111A switches the first device 100 from the first mode to the second mode which allows the user to control the second device 200 with a predetermined motion of a finger.

When the outer side of the first device 100 is not covered, the CPU 111A switches back the first device 100 from the second mode to the previous mode, that is, the first mode.

The CPU 111A determines whether the outer side of the first device 100 is covered in accordance with whether a specific portion on the outer side of the first device 100 is covered in excess of a predetermined area.

An example of the specific portion on the outer side of the first device 100 is the display 101. In other words, an example of the specific portion is the touchscreen of the first device 100.

The CPU 111A determines whether the outer side of the first device 100 is covered in accordance with whether the display 101, and more specifically, the touchscreen, on the outer side of the first device 100 is covered in excess of the predetermined area.

In the specification, "the inner side of a device" refers to the side of the device brought into contact with a user wearing the device or the side close to the user if it does not touch the user. "The outer side of a device" refers to the side opposite the inner side.

For example, if the device is a watch, the side of the watch brought into contact with the wrist of a user wearing the watch is the inner side of the watch, while the side of the watch displaying the time, for example, is the outer side of the watch. If the device is an earphone, when a user wears the earphone on the ear, a portion of the earphone inserted into and brought into contact with the ear is the inner side of the earphone, while the portion protruding from the ear is the outer side. In the case of glasses lenses, when a user wears the glasses, the lenses are not in contact with the user's eyes. Yet, the surface of the lens positioned near the eye is the inner side, and the opposite surface is the outer side.

In the case of a device that can be worn by a user in a desired manner, a certain portion of the device may become the inner side or become the outer side depending on the wearing manner (the orientation of the device, for example). For example, in the manner shown in FIG. 11A, the display 101 is the outer side of the first device 100, while, in the manner shown in FIG. 11B, the display 101 is the inner side of the first device 100.

In an exemplary embodiment, the display 101 is a touchscreen, and the CPU 111A of the first device 100 identifies a portion of the display 101 covered by a user, based on output from the touchscreen.

Based on the identified portion, the CPU 111A obtains information on the area of the portion covered by the user.

If the area of the covered portion of the first device 100 exceeds a predetermined threshold, the CPU 111A switches the first device 100 from the first mode to the second mode.

When the outer side of the first device 100 is not covered or even when it is covered, if the area of the covered portion does not exceed the predetermined threshold, the CPU 111A maintains the first device 100 in the first mode.

In an exemplary embodiment, the CPU 111A may switch the first device 100 from the first mode to the second mode when the outer side of the first device 100 is covered by the palm of the user whereas not switching the mode of the first device 100 to the second mode when the outer side of the first device 100 is covered with a fingertip.

When the outer side of the first device 100 is covered with a fingertip, it can be assumed that the user is operating the first device 100. The CPU 111A thus keeps the first device 100 in the first mode.

The CPU 111A determines whether the outer side of the first device 100 is covered by the palm of the user (portion other than a fingertip) or with a fingertip, based for example on information on the area of the portion of the display 101 touched by the user.

More specifically, if the area of the portion of the display 101 touched by the user is smaller than a predetermined threshold, the CPU 111A determines that the outer side of the first device 100 is covered with a fingertip of the user. If the area of the portion of the display 101 touched by the user is greater than or equal to the predetermined threshold, the CPU 111A determines that the outer side of the first device 100 is covered by the palm (portion other than a fingertip) of the user.

In an exemplary embodiment, the CPU 111A determines whether the outer side of the first deice 100 is covered, based on output from the touchscreen. However, different approaches may be taken to make this determination.

For example, an illuminance sensor may be provided at a portion on the outer side of the first device 100, and the CPU 111A may determine whether the outer side of the first device 100 is covered, based on output from this illuminance sensor.

For another example, a pressure sensor may be provided on the outer side of the first device 100. The CPU 111A may determine whether the outer side of the first device 100 is covered by detecting the pressure acting on the outer side of the first device 100.

For another example, the CPU 111A may determine whether the outer side of the first device 100 is covered, based on a change in the electrostatic capacitance on the surface of the first device 100.

If the CPU 111A determines whether the outer side of the first device 100 is covered based on output from an illuminance sensor, when the user wears long-sleeve clothes, the long-sleeve clothes may cover the outer side of the first device 100 and the illuminance may become low. In this case, the CPU 111A may wrongly determine that the first device 100 is covered.

If information on the illuminance is used to make the above-described determination, information on a change in the electrostatic capacitance on the surface of the first device 100, for example, may also be used.

More specifically, if, for example, output from the illuminance sensor indicates that the illuminance is low and output from the electrostatic capacitance sensor indicates that the user has touched the first device 100, it may be determined that the outer side of the first device 100 is covered by the user.

If output from the illuminance sensor indicates that the illuminance is low and if output from the electrostatic capacitance sensor does not indicate that the user has touched the first device 100, it may be determined that the outer side of the first device 100 is covered by the clothes.

For another example, if the outer side of the first device 100 is covered by an object that satisfies a predetermined condition, the first device 100 may be switched from the first mode to the second mode.

If the outer side of the first device 100 is covered by an object that does not satisfy the predetermined condition, the mode of the first device 100 is maintained in the first mode.

Determination may be made as to what is covering the first device 100, and the mode of the first device 100 may be switched based on the determination result.

Information on the type of object covering the first device 100 may be obtained, and the mode of the first device 100 may be switched based on the type of object.

More specifically, it may be determined whether the object covering the first device 100 is clothes or a user, and the mode of the first device 100 may be switched based on the determination result.

For example, if the object covering the first device 100 is clothes, the mode of the first device 100 is not switched. If the object covering the first device 100 is a user, the mode of the first device 100 is switched.

A determination as to whether the object covering the first device 100 is clothes or a user may be made based on a change in the electrostatic capacitance on the surface of the first device 100.

For another example, if the object covering the first device 100 is changed to another object, such as if the object covering the first device 100 is changed from clothes to a user, the mode of the first device 100 may be switched from the first mode to the second mode.

Even if the object covering the first device 100 is changed from clothes to a user, the illuminance may not be changed. However, with the provision of a sensor for detecting a change in the electrostatic capacitance, changing of the object from clothes to a user can be detected.

In an exemplary embodiment, when the first device 100 receives a user operation, determination may be made as to whether the user has an intention to switch the first device 100 from the first mode to the second mode or is just operating the first device 100 in the first mode.

This determination may be made based on the level of pressure acting on the first device 100, for example.

A pressure sensor for detecting the pressure acting on the first device 100 may be provided, and the above-described determination is made based on the level of pressure acting on the first device 100.

More specifically, if, for example, the pressure acting on the first device 100 exceeds a predetermined threshold, it may be determined that the user operation is simply for operating the first device 100 and the first device 100 is maintained in the first mode.

If the user is operating the first device 100 with a fingertip, the pressure acts on a specific local area of the display 101. The pressure acting on the first device 10 may tend to increase locally.

If the pressure acting on the first device 100 does not exceed the predetermined threshold, it is determined that the user operation is for switching the first device 100 from the first mode to the second mode and the mode of the first device 100 is switched to the second mode.

If the user covers the first device 100 with a palm with an intention to switch the first device 100 from the first mode to the second mode, the pressure acting on the first device 100 may be spread out or decrease. It is thus determined that the user has covered the first device 100 with an intention to switch the first device 100 to the second mode and the mode of the first device 100 is switched to the second mode.

The determination as to whether the user is operating the first device 100 or instructing to switch the first device 100 from the first mode to the second mode may be made based on the area of a covered portion of the first device 100.

More specifically, if, for example, the area of a covered portion of the first device 100 is smaller than a predetermined threshold, it is determined that the user operation is simply for operating the first device 100 and the first device 100 is maintained in the first mode.

If, for example, the area of the covered portion of the first device 100 is greater than or equal to the predetermined threshold, it is determined that the user operation is for switching the first device 100 from the first mode to the second mode and the mode of the first device 100 is switched to the second mode.

The determination as to whether the user operation is simply for operating the first device 100 or for switching the first device 100 from the first mode to the second mode may be made in other ways. For example, it may be based on both of the pressure acting on the first device 100 and the area of a covered portion of the first device 100.

More specifically, if, for example, the pressure acting on the first device 100 exceeds the predetermined threshold for the pressure and if the area of the covered portion is smaller than the predetermined threshold for the area of a covered portion, it may be determined that the user operation is simply for operating the first device 100 and the first device 100 is maintained in the first mode.

If, for example, the pressure acting on the first device 100 does not exceed the predetermined threshold for the pressure and if the area of the covered portion is greater than or equal to the predetermined threshold for the area of a covered portion, it may be determined that the user operation is for switching the first device 100 from the first mode to the second mode and the mode of the first device 100 is switched to the second mode.

The determination as to whether the outer side of the first device 100 is covered by the user may be made in accordance with whether a portion of the first device 100 other than the display 101 is covered by the user.

For example, if the first device 100 is a watch-type device, a pressure sensor, an illuminance sensor, or a sensor for detecting a change in the electrostatic capacitance may be disposed at a portion of a bezel 141 (see FIG. 12), which corresponds to the frame of the first device 100.

Then, it is determined whether the user has covered the bezel 141, based on output from the sensor. If it is determined that the bezel 141 is covered by the user, it can be determined that the user has covered the outer side of the first device 100.

In this case, information on the area of a portion of the bezel 141 touched by the user may be obtained, and if the area of the touched portion exceeds a predetermined threshold for the area, it can be determined that the user has covered the outer side of the first device 100.

Information on the pressure acting on a portion of the bezel 141 touched by the user may alternatively be obtained, and if the pressure exceeds a predetermined threshold for the pressure, it can be determined that the user has covered the outer side of the first device 100.

It is also possible to use both the area and the pressure of the touched portion. For example, if the area of the touched portion of the bezel 141 exceeds the predetermined threshold for the area and if the pressure acting on the touched portion exceeds the predetermined threshold for the pressure, it can be determined that the user has covered the outer side of the first device 100.

A pressure sensor may be disposed on the inner side of the first device 100, and based on the detection result of this pressure sensor, it may be determined whether the user has covered the outer side of the first device 100.

When the user has covered the first device 100, pressure also acts on the inner side of the first device 100. Detecting the pressure acting on the inner side of the first device 100 can also determine whether the user has covered the first device 100.

If, for example, the pressure detected by the pressure sensor exceeds a predetermined threshold, it is determined that the user has covered the first device 100 and the first device 100 is switched from the first mode to the second mode.

If, for example, the pressure detected by the pressure sensor does not exceed the predetermined threshold, it is determined that the user has not covered the first device 100 and the first device 100 is maintained in the first mode.

A pressure sensor, an illuminance sensor, or a sensor for detecting a change in the electrostatic capacitance may be disposed on a belt 142 (see FIG. 12) of the first device 100.

In this case, to switch the mode of the first device 100, the user covers the belt 142. When the user covers the belt 142, output from the sensor is changed, and the first device 100 is switched from the first mode to the second mode based on output from the sensor.

In an exemplary embodiment, the user may switch the mode of the first device 100 by covering the first device with a portion other than a hand.

Figure 13:
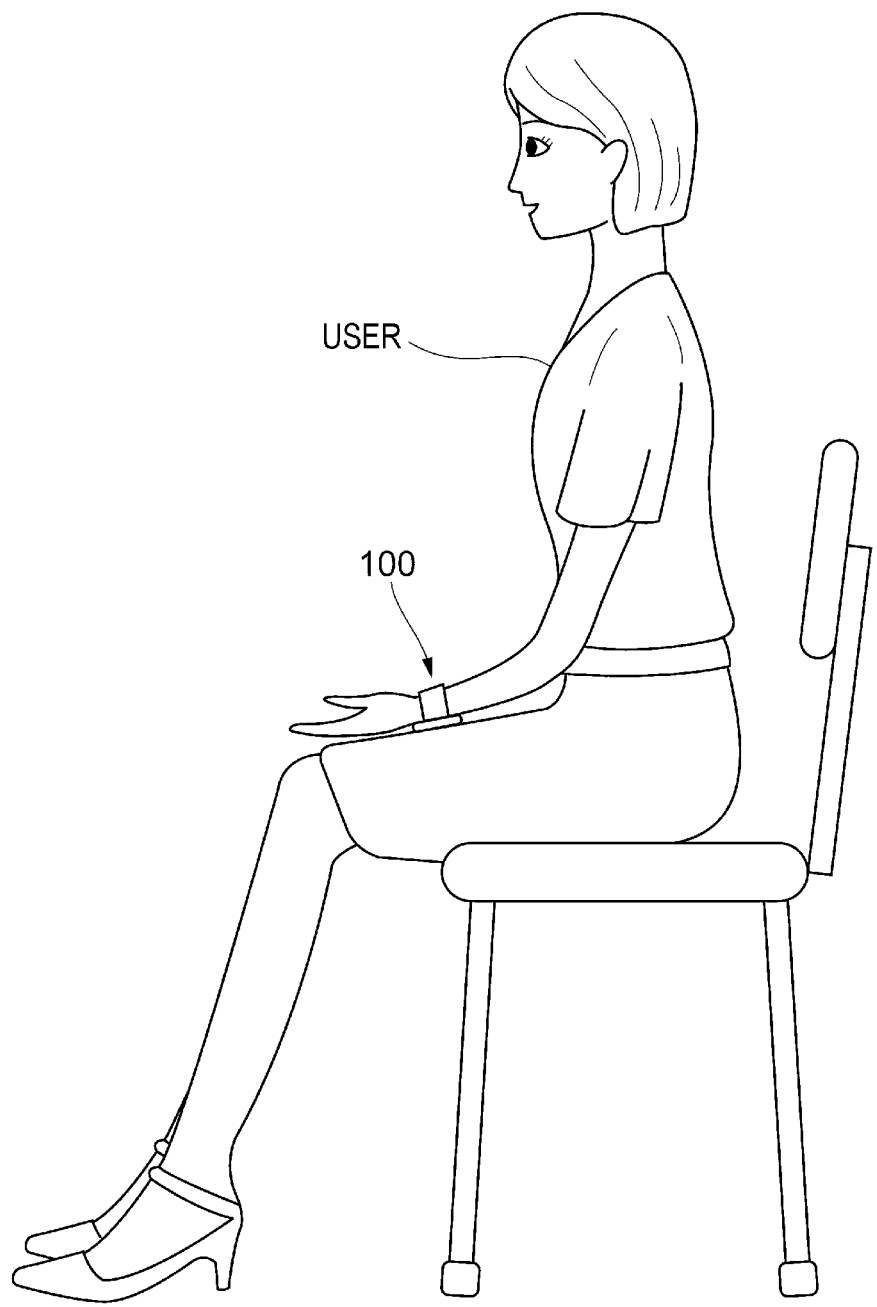
FIG. 13 illustrates a state of a user wearing an exemplary first device.

For example, when the user covers the first device 100 by bringing a specific portion on the outer side of the first device 100 to face, for example, the clothes the user is wearing, as shown in FIG. 13, the mode of the first device 100 may be switched to the second mode.

In the example in FIG. 13, the user brings the specific portion on the outer side of the display 101 to face the clothes.

More specifically, in an exemplary embodiment, when the user brings the outer side of the display 101 in contact with his/her clothes with a predetermined level of pressure, the mode of the first device 100 may be switched to the second mode.

In an exemplary embodiment, when the user brings the outer side of the first device 100 to face the clothes in such manner that the illuminance on the outer side is reduced to a predetermined threshold or lower, the mode of the first device 100 may be switched to the second mode.

Figure 14:
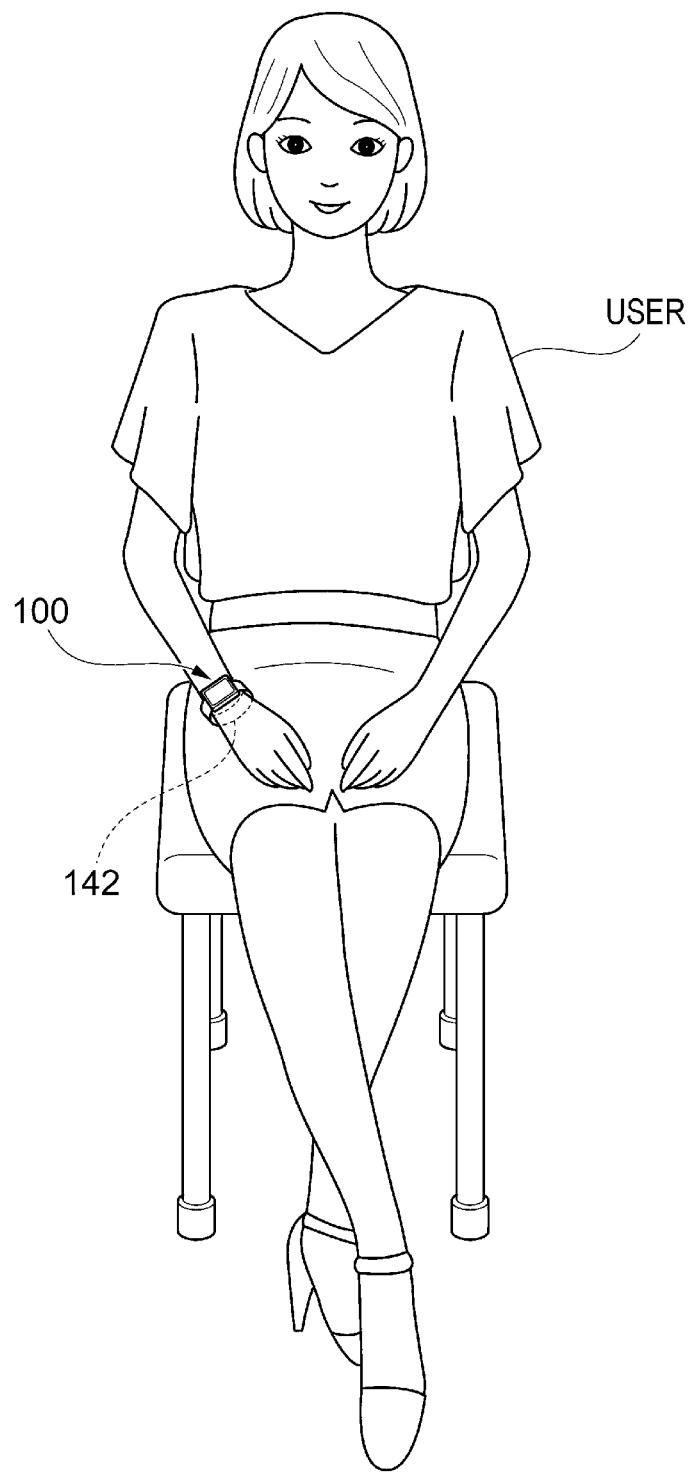
FIG. 14 illustrates another state of a user wearing an exemplary first device.

In the example in FIG. 14, the user brings the outer side of the belt 142 (an example of the specific portion on the outer side of the first device 100) to face the clothes he/she is wearing. In this example, a pressure sensor, an illuminance sensor, or a sensor for detecting a change in the electrostatic capacitance is disposed on the belt 142 of the first device 100.

More preferably, the sensor may be disposed at a portion of the belt 142 that is positioned on the side of the palm when the user wears the first device 100.

If it is assumed that the user normally wears a watch with a portion displaying the time (the display 101 of the first device 100) of the watch on the back side of the hand, the user can more easily bring the belt 142 to face the clothes than the display 101. If the sensor is provided on the belt 142, the user can take a more natural posture when bringing the belt 142 to face the clothes, compared with the example shown in FIG. 13. That is, the user can switch the mode of the first device 100 by taking a more natural posture.

Figure 15B:
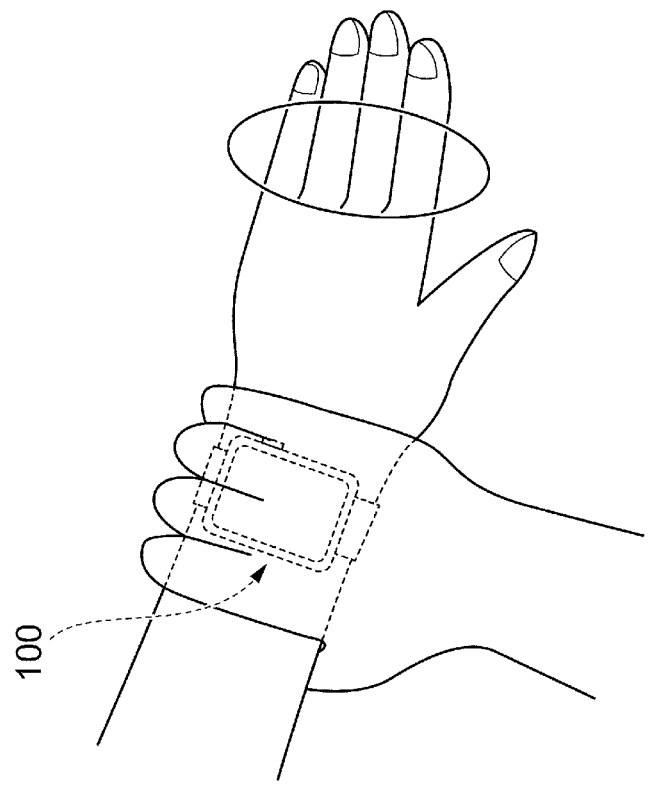
FIGS. 15A and 15B illustrate fingers of which motions are detected when an exemplary first device is in a second mode.
Figure 15A:
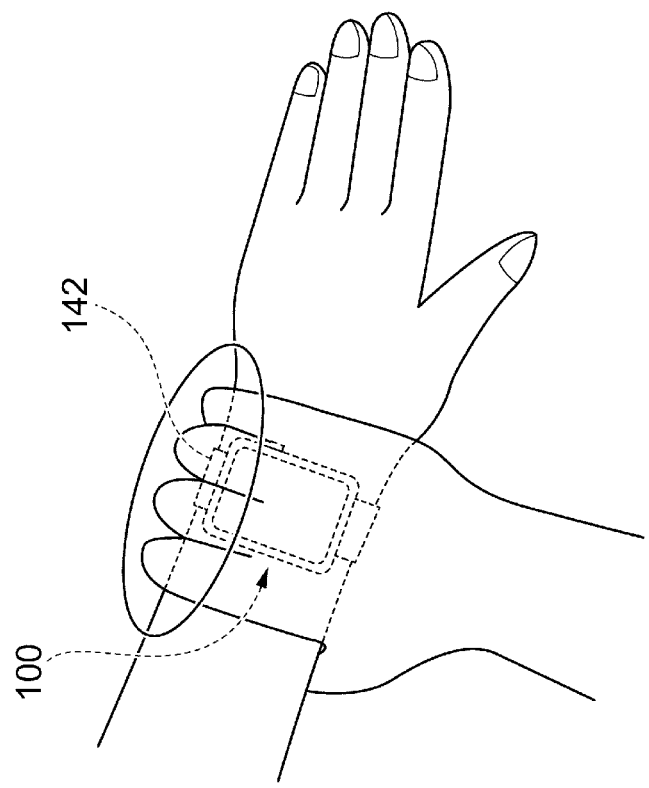

FIGS. 15A and 15B illustrate fingers of which motions are detected to control the second device when the first device 100 is in the second mode.

FIG. 15A describes a first approach in which motions of fingers on an arm that is not wearing the first device 100 are detected. FIG. 15B describes a second approach in which the motion of a finger on an arm that is wearing the first device 100 is detected.

In the first approach shown in FIG. 15A, the user moves a finger of the hand that is covering the first device 100 wherein the first device 100 is being worn on the opposite hand.

In the first approach, the motion of a finger may be detected for example by using the display 101 (touchscreen) (see FIG. 12) located on the outer side of the first device 100.

Finger motions of the hand not wearing the device may be detected in various other ways. For example, a contact sensor may be disposed at a portion of the bezel 141 (see FIG. 12), which is the frame of the first device 100, and the motion of a finger may be detected by this portion of the bezel 141. For another example, if the first device 100 is a wrist-worn device, a sensor may be disposed on the belt 142 (see FIG. 15A), and the motion of a finger may be detected by this sensor.

In the second approach in FIG. 15B, the user moves a finger on the arm wearing the first device 100.

In the second approach, the inner side of the first device may have one or more sensors for detecting, for example, vibrations or motions of muscles or tendons of the user.

The motion of a finger on the arm wearing the first device 100 is detected by using the above-described sensor. That is, in the second approach, the second device 200 is controlled based on the motion of a finger of the hand wearing the first device 100.

This allows the CPU 111A of the first device 100 to control the second device 200, based on the motion of a finger on the arm wearing the first device 100.

The first and second approaches may be combined. That is, when the first device 100 is in the second mode, motions of fingers on both arms (an arm wearing the first device 100 and the other arm that is not wearing the first device 100) may be detected and used to control the second device.

Motions of fingers of the hand wearing the first device 100 may be detected based on movements of devices 290 worn on fingers of this hand.

Figure 16:
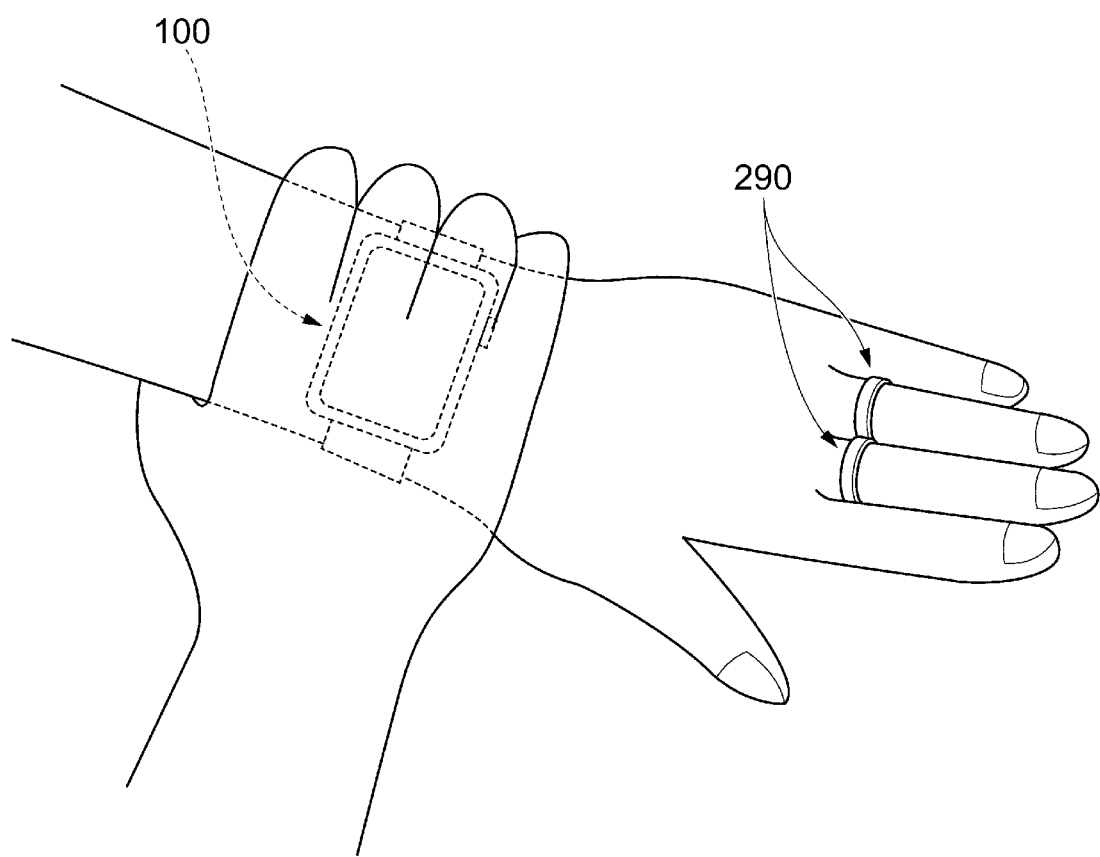
FIG. 16 illustrates another exemplary hardware configuration for detecting the motion of a finger of a user when an exemplary first device is in the second mode.

More specifically, the devices 290 may for example be rings that fit around fingers of the hand wearing the first device 100, as shown in FIG. 16.

The movements of the devices 290 may be detected for example by using the first device 100 (e.g., tracking the positional relationship between the devices 290 and the first device 100), thereby detecting motions of fingers of the hand wearing the first device 100.

In an exemplary embodiment, the user may touch a portion other than the touchscreen of the display 101. For example, if the first device 100 is a watch-type device, the bezel 141, which is the frame of the watch, may be touched by the user. For another example, a sensor may be disposed on the belt 142 and the user may touch the belt 142.

Figure 17:
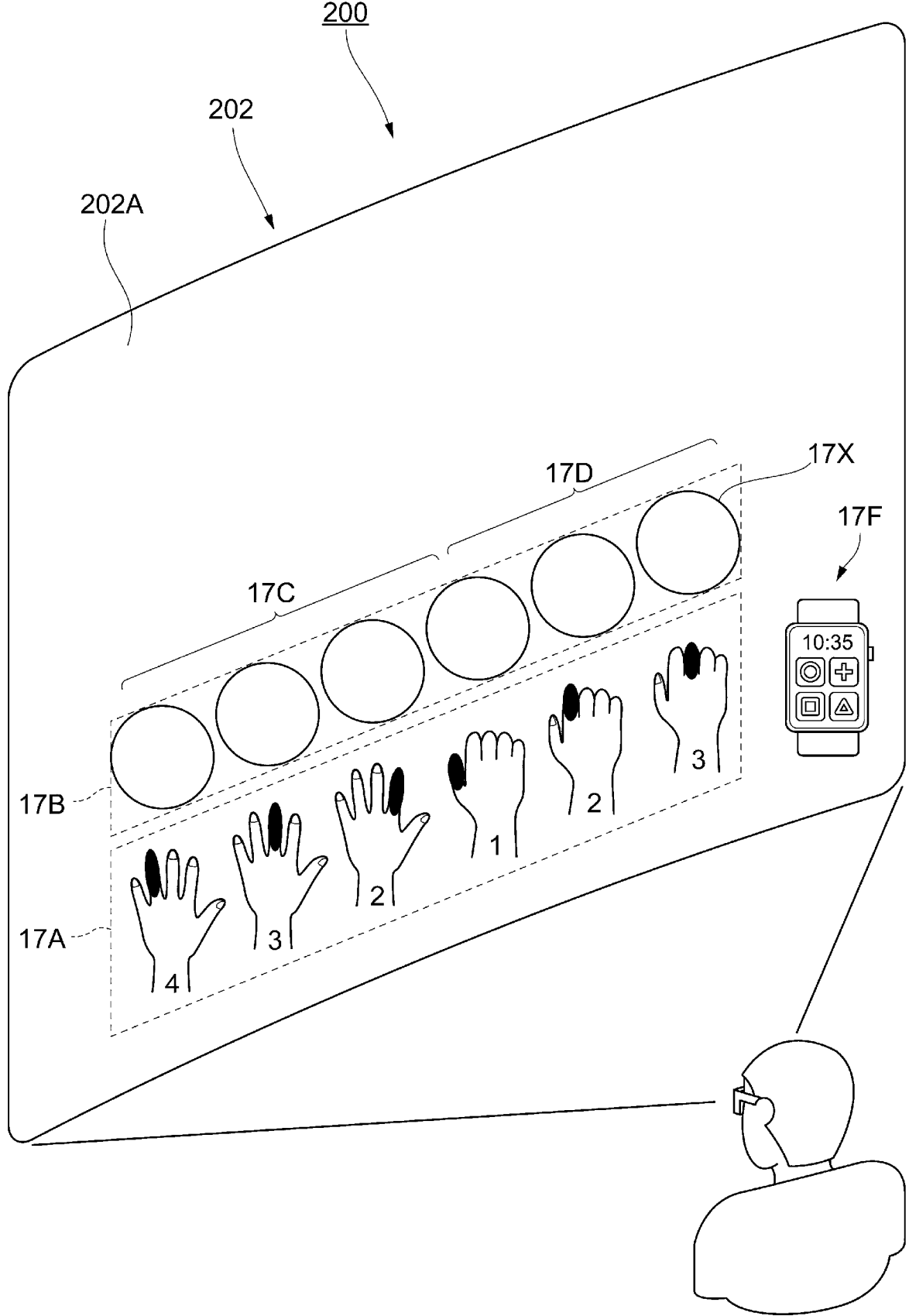
FIG. 17 illustrates a display example on a display of an exemplary second device.

FIG. 17 illustrates a display example on the display 202 (see FIG. 1) of an exemplary second device 200.

In this display example, the motion of a finger of the user and the content of processing to be executed by the second device 200 are associated with each other. In other words, in the display example in FIG. 17, information about how to control the second device 200 with a finger is given to the user.

In the display example in FIG. 17, the operation to be performed by the user when the first device 100 is in the second mode and the content of processing to be executed in the second device 200 associated with this operation are illustrated.

The operation to be performed by the user for the first device 100 is displayed in a region 17A, while the content of processing to be executed in the second device 200 is displayed in a region 17B. More specifically, the content of processing to be executed in the second device 200 is displayed inside a circular region 17X, though it is not shown.

In the display example in FIG. 17, the operation to be performed by the user when the user is covering the first device 100 with the right hand and the content of processing associated with this operation are displayed.

More specifically, the operation to be performed by the user with the left hand and the content of processing to be executed in the second device 200 associated with this operation are displayed. The operation to be performed by the user with the right hand and the content of processing to be executed in the second device 200 associated with this operation are also displayed.

In other words, in FIG. 17, information concerning the content of processing to be executed in the second device 200 in response to the detecting of the motion of a finger of the arm wearing the first device 100 and that of the other arm without the first device 100 are both displayed.

When the user is covering the first device 100 with the right hand, it can perform an operation for the first device 100 by moving a finger of the right hand and a finger of the left hand.

In the display example in FIG. 17, the motion of a finger of the left hand and the content of processing associated with this motion are displayed in a region 17C.

More specifically, in this display example, the motion of a finger of the left hand wearing the first device 100 and the content of processing associated with this motion are displayed on the left side of a display screen 202A of the display 202 (see FIG. 1).

In the display example in FIG. 17, the motion of a finger of the right hand and the content of processing associated with this motion are displayed in a region 17D.

More specifically, in this display example, the motion of a finger on the right hand without the first device 100 and the content of processing associated with this motion are displayed on the right side of the display screen 202A.

In an exemplary embodiment, the motion of a finger of the left hand is displayed on the left side of the display screen 202A, while the motion of a finger of the right hand is displayed on the right side of the display screen 202A. This arrangement allows the user to intuitively recognize the content of operation associated with the motion of a finger of each hand, compared with the arrangement in which the display order is reversed.

In the display example in FIG. 17, an image 17F representing the first device 100 is displayed. This indicates that the user can control the second device 200 by performing an operation at the first device 100.

This display example indicates that the first device 100 is in the second mode (remote control mode) for operating the second device 200.

The display example in FIG. 17 is an example in which the first device 100 is worn on the left hand of the user.

In a display example in which the first device 100 is worn on the right hand of the user, the motion of a finger of the left hand without the first device 100 and the content of processing associated with this motion are displayed in the region 17C, while the motion of a finger of the right hand wearing the first device 100 and the content of processing associated with this motion are displayed in the region 17D. Such a display mode is not illustrated in FIG. 17.

It may be determined whether the first device 100 is worn on the left hand or the right hand of the user, and based on the determination result, the display content of the display 202 of the second device 200 may automatically be switched.

If it is determined that the first device 100 is worn on the left hand of the user, a display example, such as that shown in FIG. 17, is displayed.

In the display example in FIG. 17, as discussed above, the motion of a finger of the left hand and the content of processing associated with this motion are displayed in the region 17C, while the motion of a finger of the right hand and the content of processing associated with this motion are displayed in the region 17D.

If it is determined that the first device 100 is worn on the right hand of the user, the motion of a finger of the left hand and the content of processing associated with this motion are displayed in the region 17C, while the motion of a finger of the right hand and the content of processing associated with this motion are displayed in the region 17D.

Figure 18:
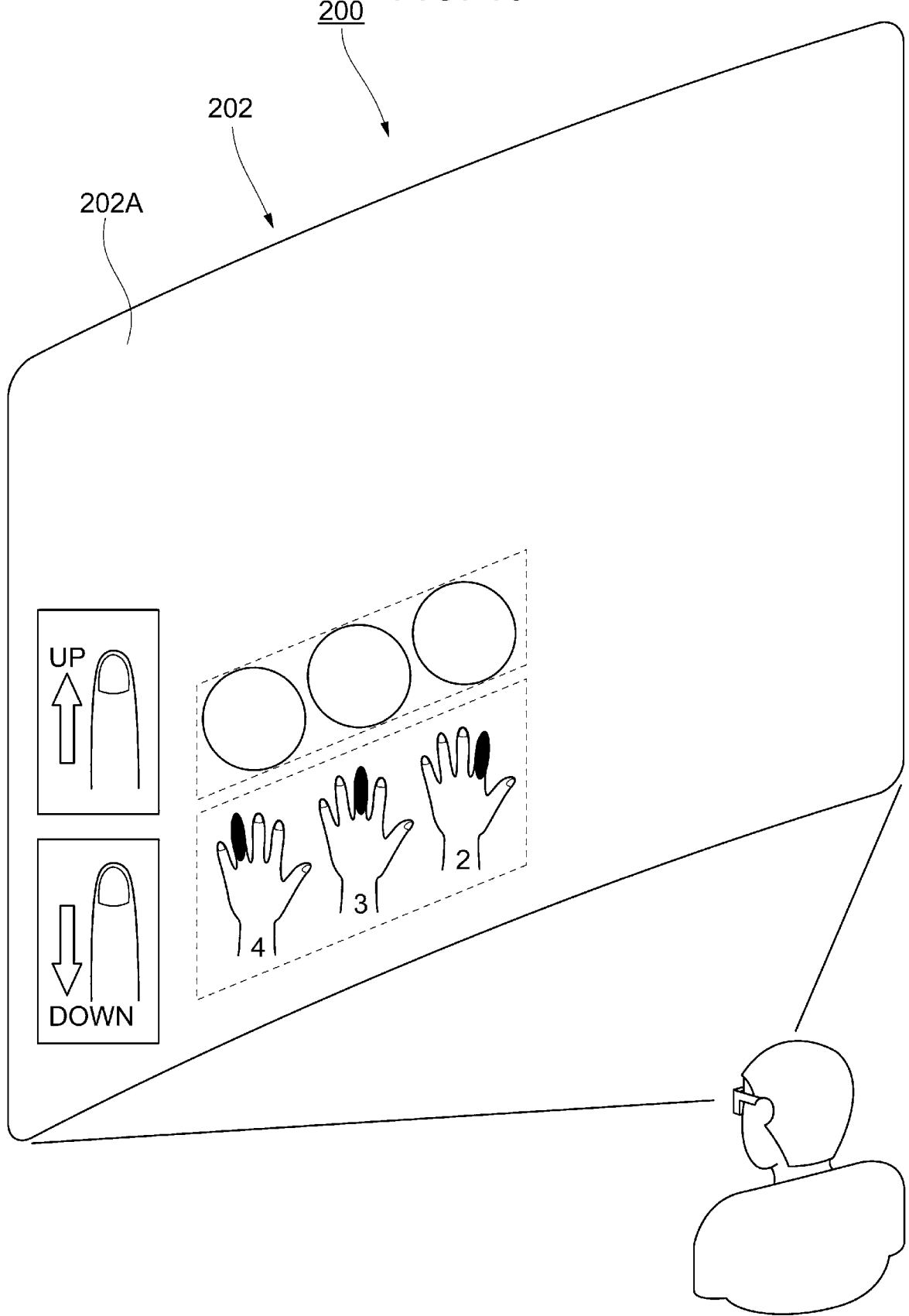
FIG. 18 illustrates another display example on the display of an exemplary second device.

FIG. 18 illustrates another display example of an exemplary second device 200.

This display example shows that a finger of the hand wearing the first device 100 can be moved, and more specifically, a finger of the left hand wearing the first device 100 can be moved.

On the display 202 of the second device 200, as shown in FIG. 18, the motion of a finger of the left hand wearing the first device 100 and the content of processing associated with this motion are displayed.

In an exemplary embodiment, in one mode, the user can perform an operation for the first device 100 with a finger of the hand wearing the first device 100 (hereinafter referred to as "the device-side operation"). In another mode, the user can perform an operation for the first device 100 with a finger of the hand without the first device 100 (hereinafter referred to as "the non-device-side operation").

In still another mode, the user can perform both the device-side operation and the non-device-side operation for the first device 100.

In an exemplary embodiment, these three operation modes are available, and for each of the three operation modes, the first device 100 receives the content of operation performed by the user.

In an exemplary embodiment, the user may be able to select one of the three operation modes. In this case, in the operation mode selected by the user, the first device 100 receives the content of operation performed by the user.

In an exemplary embodiment, for each first device 100, the operation mode that can be used may be determined in advance. In this case, the user performs an operation by using the operation mode determined for the first device 100 and the first device 100 receives the operation performed by the user.

If the user is able to select the operation mode, a display example of the operation mode selected by the user is displayed on the display 202 of the second device 200.

For example, in the operation mode in which both the device-side operation and the non-device-side operation can be performed, the display example in FIG. 17 is displayed. In the operation mode in which the user can perform only the device-side operation, the display example in FIG. 18 is displayed.

In the operation mode in which the user can perform only the non-device-side operation, the motion of a finger of a hand without the first device 100 and the content of processing associated with this motion are displayed, though such a display example is not illustrated.

Figure 19:
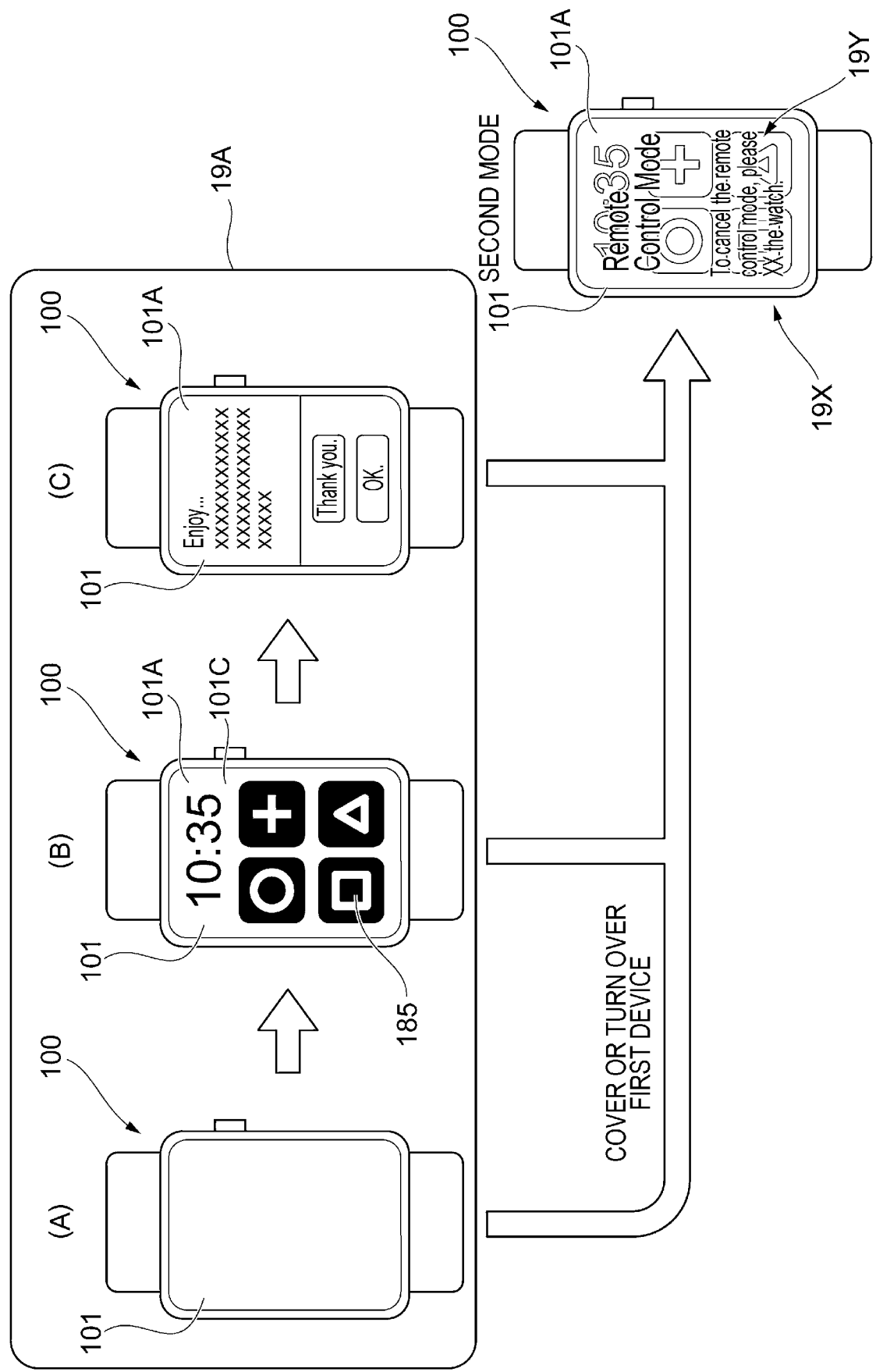
FIG. 19 illustrates a transition example of a display screen of an exemplary first device.
Figure 20:
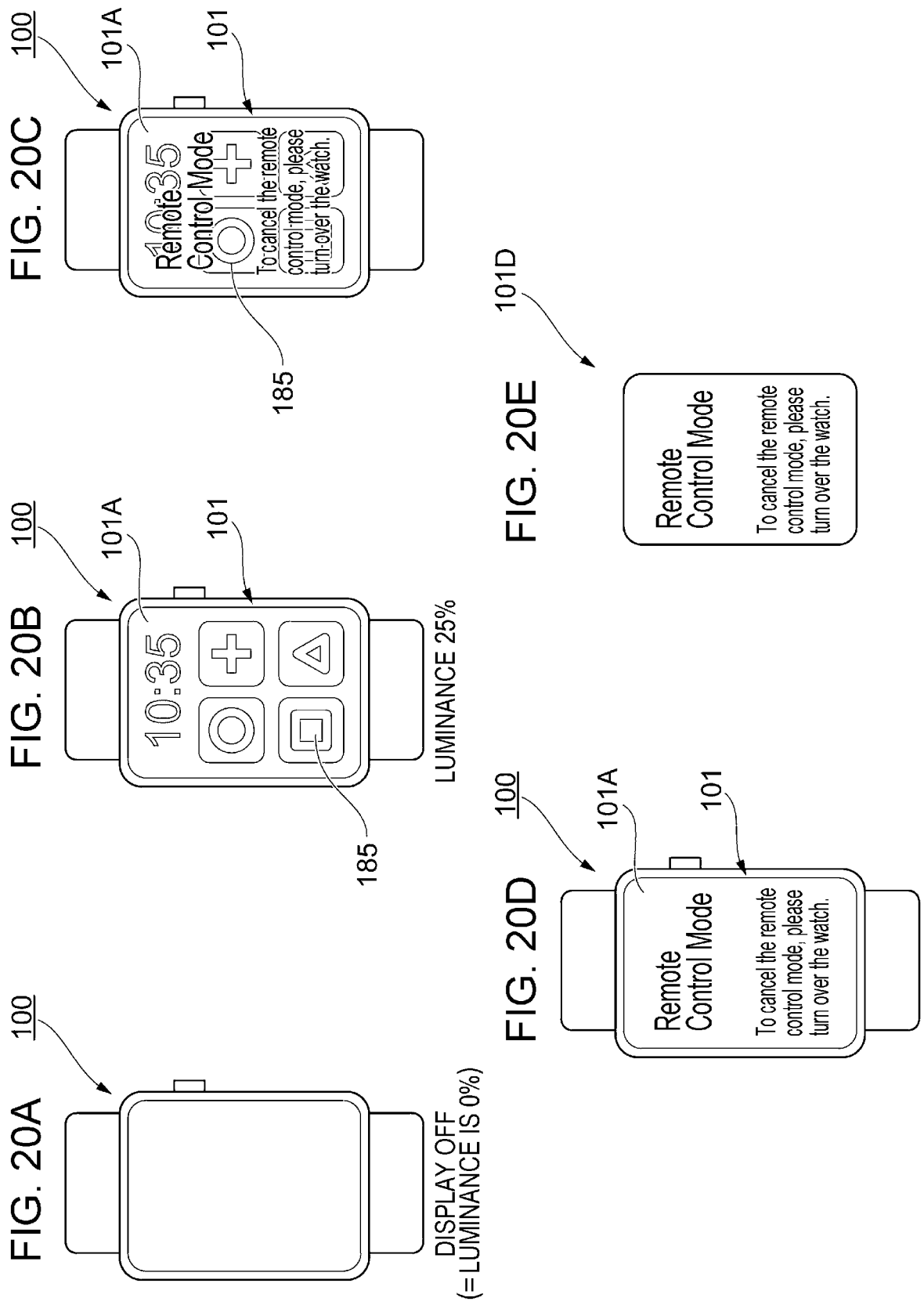
FIGS. 20A through 20E illustrate display examples of exemplary first device in the second mode.

FIG. 19 illustrates a transition example of the screen of the display 101 of an exemplary first device 100.

In FIG. 19, display examples of the first device 100 that have not been rotated or covered by the user are shown in a section 19A of FIG. 19.

In other words, display examples of the first device 100 in the first mode are shown in the section 19A of FIG. 19.

If the first device 100 in the first mode has not been operated for a certain period of time, it enters the sleep mode and the display 101 is turned OFF, as indicated by (A) of FIG. 19.

In the sleep mode, when the user lifts the hand wearing the first device 100, the display 101 is turned ON, as indicated by (B) of FIG. 19, and the user is able to view applications on the display screen 101A, and more specifically, display elements 185, such as icons, on the display screen 101A.

When the user selects one of the applications displayed on the display screen 101A, the screen corresponding to the selected application is displayed, as indicated by (C) of FIG. 19.

In other words, when the user makes a predetermined gesture, such as tapping, on a display element 185 (icon, for example) on the display 101, the screen associated with the selected one of the applications installed in the first device 100 is displayed on the display screen 101A.

More specifically, in the example in (C) of FIG. 19, the screen of a message sending/receiving chat application selected by the user is displayed on the first device 100. In this example, a chat message "Enjoy" received from another user (user A, for example) is displayed, and options "OK." and "Thank you." as a return message are also displayed.

A display example of the first device 100 when the first device 100 is switched from the first mode to the second mode will be discussed below.

When switching the first device 100 from the first mode to the second mode, the CPU 111A changes the display content of the display 101 of the first device 100.

As shown in FIGS. 5A, 5B, 7A, 7B, 11A, 11B, and 12, when the orientation of the first device 100 is changed or the first device 100 is covered by the user, the CPU 111A changes the display content of the display 101. For example, a screen 19X in FIG. 19 is displayed on the display 101.

As described above, in an exemplary embodiment, when the orientation of the first device 100 is changed or the first device 100 is covered by the user, the first device 100 is switched from the first mode to the second mode. As a result, the display screen 101A is switched to the screen 19X, for example.

In an exemplary embodiment, regardless of what is the display content on the first device 100 in the first mode, when the first device 100 is switched from the first mode to the second mode, the display screen 101A is switched to the screen 19X, for example.

Additionally, regardless of whether or not the screen is displayed on the first device 100 in the first mode, when the first device 100 is switched from the first mode to the second mode, the display screen 101A is switched to the screen 19X, for example.

For example, regardless of whether the menu screen in (B) of FIG. 19 or a screen other than the menu screen is displayed on the first device 100, the screen 19X, for example, is displayed on the display 101 when the first device 100 is switched from the first mode to the second mode.

Even when the display 101 is OFF, as indicated by (A) of FIG. 19, the screen 19X, for example, is displayed on the display 101 when the first device 100 is switched from the first mode to the second mode.

On the screen 19X, "Remote Control Mode" is written to indicate that the first device 100 is in the remote control mode (second mode) which allows the user to control the second device 200 via the first device 100.

On the screen 19X, an instruction 19Y about how to shift (return) to the first mode is displayed.

FIGS. 20A through 20E illustrate display examples of an exemplary first device 100 in the second mode.

When the first device 100 is in the second mode, screens, such as those shown in FIGS. 20A and 20B, may be displayed, apart from the screen 19X in FIG. 19. The luminance of the display 101 is lowered in FIGS. 20A and 20B.

In FIG. 20A, the luminance of the display 101 is 0%. This state of the display 101 may be described as the display 101 being OFF.

In FIG. 20B, the display screen 101A displayed in the first mode (see (B) of FIG. 19) is grayed out. The luminance of the display screen 101A in FIG. 20B is 25%.

In FIG. 20B, although the display elements 185, such as icons, on the display screen 101A can be seen, they are not activated. Even if the user performs an operation, such as tapping and swiping, on a display element 185, this operation is not received.

An example of the display screen 101A of the first device 100 in the first mode is shown in (B) of FIG. 19. The luminance of the display screen 101A in this state is 100%.

The luminance of the display screen 101A in FIG. 20A is decreased to 0%, while the luminance of the display screen 101A in FIG. 20B is decreased to 25%. This allows the user to recognize that the first device 100 is in the second mode.

The display screen 101A in FIG. 20C is the same as the screen 19X in FIG. 19.

The display screen 101A in FIG. 20C is a screen on which a display screen 101D in FIG. 20E without the display elements 185 that can be selected by the user in the first mode (hereinafter called the second display screen 101D) is superimposed on the display screen 101A in (B) of FIG. 19 displayed on the display 101 of the first device 100 in the first mode (hereinafter called the first display screen 101C).

FIG. 20E shows only the second display screen 101D. When switching the first device 100 from the first mode to the second mode, the CPU 111A superimposes the second display screen 101D on the first display screen 101C (see (B) of FIG. 19) displayed on the display 101 of the first device 100 in the first mode.

As a result, in the second mode, the display screen 101A shown in FIG. 20C is displayed on the first device 100.

On the first display screen 101C (display screen 101A in (B) of FIG. 19) of the first device 100 in the first mode, the display elements 185, such as buttons, icons, and links, to be selected by the user are displayed.

In contrast, on the display screens 101A in FIGS. 20B and 20C, the user is unable to select any display element 185.

To put it another way, the user can no longer select the display elements 185 that are displayed on the first device 100 and can be selected in the first mode.

When the first device 100 is switched from the first mode to the second mode, the CPU 111A of the first device 100 changes the display screen 101A to the display content, such as one of those shown in FIGS. 20B and 20C, thereby enabling the user to recognize that it can no longer select the display elements 185.

In the display examples in FIGS. 20B and 20C, although the user can view the display elements 185 that are displayed in the first mode, the user is unable to select them.

The display examples in FIGS. 20B and 20C show that the display elements 185 are not activated, namely, the user is unable to select the display elements 185.

In the display examples in FIGS. 20B and 20C, even if the user touches the display 101, the first device 100 does not respond to this operation so that the user can recognize that none of operations on the display 101 are meaningful.

To show that the display elements 185 are not activated, the colors of the display elements 185 used when the first device 100 is in the first mode may be changed to black and white.

In the display examples in FIGS. 20B and 20C, even if the user touches a display element 185 and performs an operation, the CPU 111A does not execute processing for this display element 185.

The display screen 101A shown in FIG. 20D does not include any display element 185. In other words, in this display screen 101A, only the second display screen 101D in FIG. 20E is displayed on the display 101 of the first device 100.

In an exemplary embodiment, when switching the first device 100 from the first mode to the second mode, the CPU 111A may change the first display screen 101C (display screen 101A in (B) of FIG. 19) to the second display screen 101D without the display elements 185, such as the display screen 101A shown in FIG. 20D.

The display screen 101A shown in FIG. 20D does not include any display element 185, such as buttons, icons, and links, which respond to user operation.

In the display example in FIG. 20D, too, even if the user touches the display 101, the first device 100 does not respond to this operation so that the user can recognize that none of operations on the display 101 are meaningful.

The display screen 101A in FIG. 20D indicates that the first device 100 is in the second mode, that is, the remote control mode, which allows the user to control the second device 200 via the first device 100.

Text or an image, such as an illustration or an icon, may be used to indicate that the first device 100 is in the second mode. Additionally, on the display screen 101A in FIG. 20D, an instruction about how to cancel the second mode is displayed.

Figure 21:
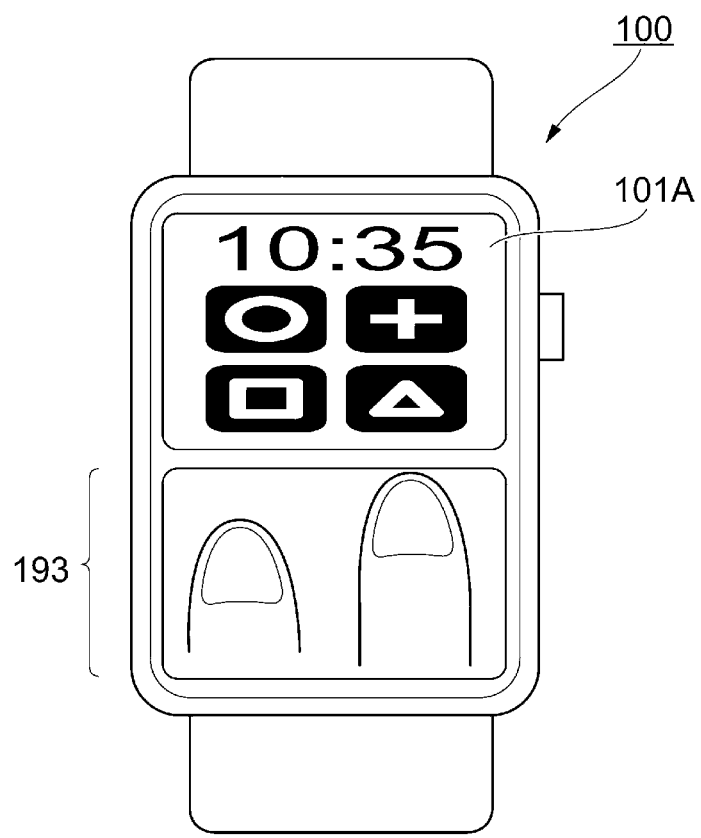
FIG. 21 illustrates another display example of an exemplary first device in the second mode.

FIG. 21 illustrates another display example of an exemplary first device 100 in the second mode.

In this display example, the layout of the display screen 101A of the first device 100 is changed in response to the first device 100 being switched from the first mode to the second mode.

More specifically, when the first device 100 is switched from the first mode to the second mode, the display screen 101A displayed in the first mode (see (B) of FIG. 19) shrinks and is displayed on the top half of the display region of the first device 100, as shown in FIG. 21. Instead of on the top half region, the display screen 101A in (B) of FIG. 19 may be displayed on the bottom, left, or right half of the display region. The display screen 101A in (B) of FIG. 19 may not necessarily be reduced to one half and may be reduced to a size set by the user.

In this display example, when the first device 100 is switched from the first mode to the second mode, the bottom half of the display region of the first device 100 (that is, the region where the reduced display screen 101A is not displayed) serves as a receiving region 193 for receiving a user operation for the second device 200.

An image indicating the user's index finger and middle finger, for example, is displayed so that the user can recognize the function of the receiving region 193. The fingers displayed in the receiving region 193 may be changed depending on whether the user is left-handed or right-handed or whether the user is wearing the first device 100 on the left or right hand.

This display example shows the user how to control the second device 200, that is, which finger the user is required to move at which portion of the first device 100 in order to control the second device 200.

In this display example, the user moves (taps) a finger in the receiving region 193 to control the second device 200.

The display mode of the receiving region 193 is not limited to that in FIG. 21. A plain image without text or icons may be displayed. Alternatively, text, such as "Operation for the second device 200 is received in this region" may be displayed.

As an example of the technique for using a certain user device (a smartwatch, for example) to control another user device (a smartphone, for example), the following related art is available. On a smartwatch, an icon of an application for operating a smartphone paired with this smartwatch is displayed. When the icon is selected on the smartwatch, a button indicating a function that can be executed in the smartphone is displayed on the smartwatch.

In a more specific example, when a user taps on the icon of an application for operating the camera of the smartphone (corresponding to the second device 200) on the smartwatch (corresponding to the first device 100), a button for releasing the shutter of the camera of the smartphone is displayed on the smartwatch. Then, the user taps on this button to take a photo or a video with the camera of the smartphone.

In this example, it is difficult for the user to set the smartwatch in a mode to control the smartphone without looking at the screen displayed on the smartwatch. Additionally, if the user wears a glasses-type device, it may be difficult to view the touchscreen of the smartwatch because of the presence of this device or the screen displayed on the device. In this case, the user is required to take off the glasses-type device or turn OFF the screen displayed on the device.

In contrast, the exemplary embodiments shown in FIGS. 1 through 21 allow a user to rotate or cover a certain device (first device 100) to change the mode of this device to another mode in which the user can control another device (second device 200). That is, the user can switch the mode of the first device 100 without necessarily looking at it.

In the exemplary embodiments described so far, the following examples have been discussed: a watch as an example of the wrist-worn first device 100, a ring as an example of the finger-worn first device 100, and a smartphone with a neck strap as an example of the neck-worn first device 100. However, the first device 100 is not limited to these types of devices. The first device 100 may be a device worn on the upper body (including the head, neck, back, abdomen, and arms) or a device worn on the lower body (including the waist, hips, and legs), or a device worn on both the upper body and the lower body. More specifically, the first device 100 may be provided in the form of a hat, a cap, a contact lens, a headset, an earphone, an earring, a clip-on earring, a belly warmer, a neck warmer, a necklace, a scarf, an arm warmer, a wrist band, a glove, an artificial nail, a nail sticker, tops (long-sleeve clothes, short-sleeve clothes, and tank tops, for example), bottoms (skirt and pants, for example), a dress, a shoe, and a sock.

Among these exemplary first devices 100, some can be rotated about the abdomen, neck, arm, or finger, as in the watch-like or ring-like first device 100, and as a result of the first devices 100 being rotated to change the orientation, the first devices 100 may switch their modes. In other words, part of the human body can pass through a hole formed in these exemplary first devices 100.

For example, in the first device 100 formed as a belly warmer, a neck warmer, a necklace, an arm warmer, and a wrist band, part of the body can pass through a hole formed in the first device 100.

The first device 100 is rotated about the part of the body so as to change the mode of the first device 100.

Some examples of the first device 100 can be worn on part of the human body. Examples of this type of first device 100 are a hat, a cap, a glove, a shoe, and a sock.

For example, in the first device 100 formed like a hat, the hat is circumferentially rotated about the head of a user so as to switch the mode of the first device 100.

In the first device 100 formed like a glove, a shoe, or a sock, as a result of changing the first device 100 worn on the right hand or the right foot to the left hand or the left foot, or vice versa, the mode of the first device 100 can be switched.

In some examples of the first device 100, the first device 100 can be inserted into a hole of the human body. An example of this type of first device 100 is an earphone.

As a result of the first device 100 formed like an earphone being circumferentially rotated about a portion of the earphone inserted into a user's ear, the mode of the first device 100 can be switched.

In some examples of the first device 100, the first device 100 can pass through a hole of the human body and be hung from this hole. An example of this type of first device 100 is an earring worn on an ear lobe.

As a result of the first device 100 formed like an earring being circumferentially rotated about a portion of the earring passing through a hole in the ear lobe, the mode of the first device 100 can be switched.

In the first device 100 formed like an earring, as a result of switching the earring fixed on one side of the ear lobe to another side, the mode of the first device 100 can be switched.

In some examples of the first device 100, the first device 100 can sandwich part of the human body. Examples of this type of first device 100 are a headset sandwiching the head and a clip-on earring sandwiching the ear lobe.

In the first device 100 formed like a headset, as a result of the user swapping the left-side earbud and the right-side earbud of the headset when wearing the first device 100, the mode of the first device 100 can be switched.

In the first device 100 formed like a clip-on earing, as a result of the user swapping a portion of the clip-on earring on one side of the ear lobe and the other portion on the other side when wearing the first device 100, the mode of the first device 100 can be switched.

In the examples of the first device 100 provided in the form of a scarf, tops (long-sleeve clothes, short-sleeve clothes, and tank tops, for example), an artificial nail, or a nail sticker, a pressure sensor, an illuminance sensor, or a sensor for detecting a change in the electrostatic capacitance is disposed on the outer side of the first device 100, as discussed above. Then, when the outer side of the first device 100 is covered by a user, the mode of the first device 100 is switched.

The disclosure is not restricted to the above-described configurations discussed in exemplary embodiments and modified examples. Modifications may be made within the scope of the disclosure.

For example, each of the above-described configurations may be partially omitted, or another function may be added to each of the configurations.

Plural exemplary embodiments have been discussed above. The configuration in one exemplary embodiment may be partially replaced by that in another exemplary embodiment, and the configuration in one exemplary embodiment may be partially added to that in another exemplary embodiment.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A non-transitory computer readable medium storing a program causing a computer to execute a process, the process comprising:
  switching a mode of a wrist-worn device being worn on a first arm of a user from a first mode to a second mode in response to an outer side of the wrist-worn device being covered by a hand of a second arm opposite the first arm of the user, the second mode being a mode which allows the user to instruct a second device that is different from the wrist-worn device to perform a plurality of types of processing, wherein the plurality of types of processing comprises a first processing associated with the motion of the finger of the hand covering the wrist-worn device and a second processing associated with a motion of a fingertip of the first arm, the wrist-worn device comprises a second sensor, and in the second mode, the wrist-worn device detects the motion of the fingertip of the first arm using the second sensor, wherein the wrist-worn device has a display that displays a displayed element, in the first mode of the wrist-worn device, the wrist-worn device is configured to execute a processing associated with the displayed element on the display of a first display device in response to a detection of a touch operation on the displayed element, and in the second mode of the wrist-worn device, the wrist-worn device detects the motion of the finger of the hand covering the wrist-worn device.

2. The non-transitory computer readable medium according to to claim 1, wherein the switching of the mode of the wrist-worn device from the first mode to the second mode is in response to a determination that the size of the covered portion of the wrist-worn device exceeds a predetermined threshold.

3. The non-transitory computer readable medium according to claim 1, wherein the switching of the mode of the wrist-worn device from the first mode to the second mode is in response to the hand of the second arm of the user covering the wrist-worn device with a pressure satisfying a predetermined condition.

4. The non-transitory computer readable medium according to claim 1, wherein the process further comprises, when switching the mode of the wrist-worn device to the second mode, reducing luminance of a display of the wrist-worn device.

5. The non-transitory computer readable medium according to claim 1, wherein the process further comprises causing a display of the wrist-worn device in the second mode to display content that was being displayed in a first area of the display in the first mode in a second area that is smaller than the first area in the second mode so that the content is displayed without being hidden by any part of the user's body in the second mode.

6. The non-transitory computer readable medium according to claim 1, wherein the predetermined gesture is sensed by a sensor at a display of the wrist-worn device.

7. The non-transitory computer readable medium according to claim 1, wherein the wrist-worn device comprises a first sensor at a bezel of the wrist-worn device, and in the second mode, the wrist-worn device detects the motion of the of the finger of the hand using the first sensor.

8. The non-transitory computer readable medium according to claim 1, wherein the wrist-worn device comprises a first sensor at a belt of the wrist-worn device, and in the second mode, the wrist-worn device detects the motion of the of the finger of the hand using the first sensor.

9. The non-transitory computer readable medium according to claim 1, wherein the second sensor is at a side in contact with the first arm.

10. The non-transitory computer readable medium according to claim 9, wherein the process further comprising:

displaying, on a display of the second device during the second mode, a display screen that includes a first region and a second region, wherein during the second mode, a first element represented the first motion and a second element represented the second motion are displayed in the first region of the display screen, and a content of processing to be executed in the second device associated with each of the first motion and the second motion are displayed in the second region of the display screen.

11. A wrist-worn device comprising a processor configured to:

switch a mode of the wrist-worn device being worn on a first arm of a user from a first mode to a second mode in response to a hand of a second arm opposite the first arm of the user covering the wrist-worn device, the second mode being a mode that allows the user to instruct another device to perform a plurality of types of processing, wherein the plurality of types of processing comprises a first processing associated with the motion of the finger of the hand covering the wrist-worn device and a second processing associated with a motion of a fingertip of the first arm, the wrist-worn device comprises a second sensor, and in the second mode, the wrist-worn device detects the motion of the fingertip of the first arm using the second sensor, wherein the wrist-worn device has a display that displays a displayed element, in the first mode of the wrist-worn device, the wrist-worn device is configured to execute a processing associated with the displayed element on the display of a first display device in response to a detection of a touch operation on the displayed element, and in the second mode of the wrist-worn device, the wrist-worn device detects the motion of the finger of the hand covering the wrist-worn device.

12. A method comprising:

switching a mode of a wrist-worn device being worn on a first arm of a user from a first mode to a second mode in response to a hand of a second arm opposite the first arm of the user covering the wrist-worn device, the second mode being a mode that allows the user to instruct a second device that is different from the wrist-worn device to perform a plurality of types of processing, wherein the plurality of types of processing comprises a first processing associated with the motion of the finger of the hand covering the wrist-worn device and a second processing associated with a motion of a fingertip of the first arm, the wrist-worn device comprises a second sensor, and in the second mode, the wrist-worn device detects the motion of the fingertip of the first arm using the second sensor, wherein the wrist-worn device has a display that displays a displayed element, in the first mode of the wrist-worn device, the wrist-worn device is configured to execute a processing associated with the displayed element on the display of a first display device in response to a detection of a touch operation on the displayed element, and in the second mode of the wrist-worn device, the wrist-worn device detects the motion of the finger of the hand covering the wrist-worn device.

* * * * *